United States Patent
Hegarty et al.

(10) Patent No.: US 10,983,771 B1
(45) Date of Patent: *Apr. 20, 2021

(54) QUALITY CHECKING INFERRED TYPES IN A SET OF CODE

(71) Applicant: Oracle International Corporation, Redwood Shores, CA (US)

(72) Inventors: Chris Hegarty, Dublin (IE); Maurizio Cimadamore, Donabate (IE)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/690,911

(22) Filed: Nov. 21, 2019

(51) Int. Cl.
   *G06F 8/41* (2018.01)
   *G06F 11/36* (2006.01)
   *G06F 16/22* (2019.01)

(52) U.S. Cl.
   CPC .......... *G06F 8/437* (2013.01); *G06F 11/3604* (2013.01); *G06F 16/2246* (2019.01)

(58) Field of Classification Search
   CPC ... G06F 8/437; G06F 16/2246; G06F 11/3604
   USPC .................................................. 717/131–145
   See application file for complete search history.

(56) References Cited

U.S. PATENT DOCUMENTS

| | | | | |
|---|---|---|---|---|
| 5,488,727 A * | 1/1996 | Agrawal | ............... | G06F 9/4491 717/154 |
| 5,748,966 A * | 5/1998 | Sato | ........................ | G06F 8/437 717/116 |
| 7,350,198 B2 * | 3/2008 | Kluger | ...................... | G06F 8/31 717/140 |
| 7,426,503 B2 * | 9/2008 | Baras | ...................... | G06F 8/437 706/45 |
| 7,644,398 B2 * | 1/2010 | Cleaveland | ......... | G06F 11/3684 717/135 |
| 8,079,023 B2 * | 12/2011 | Chen | ...................... | G06F 8/437 717/140 |
| 8,201,155 B2 * | 6/2012 | Aharoni | .................. | G06F 8/447 717/140 |

(Continued)

OTHER PUBLICATIONS

Wand, "Embedding Type Structure in Semantics", ACM, pp. 1-6 (Year: 1984).*

(Continued)

*Primary Examiner* — Anil Khatri
(74) *Attorney, Agent, or Firm* — Invoke

(57) ABSTRACT

An explicit type for a construct is not necessarily specified by a set of code. Where an explicit type is not specified for a particular construct, a compiler performs type inference for the particular construct. If the compiler infers a denotable type is associated with the construct, the compiler proceeds to perform quality checking for the particular construct by evaluating quality conditions with respect to the inferred denotable type. However, if the compiler determines that a non-denotable type is associated with the construct, then the compiler selects a target type determination process based on an attribute of the inferred non-denotable type associated with the particular construct. The compiler determines one or more target types using the selected target type determination process. The compiler performs quality checking for the particular construct by evaluating quality conditions with respect to the target types.

20 Claims, 12 Drawing Sheets

(56) References Cited

U.S. PATENT DOCUMENTS

| | | | | |
|---|---|---|---|---|
| 8,275,731 B2* | 9/2012 | Meijer | ................ | G06F 16/2438 |
| | | | | 706/45 |
| 8,296,744 B2* | 10/2012 | Langworthy | ............. | G06F 8/75 |
| | | | | 717/143 |
| 8,549,502 B2* | 10/2013 | Husbands | ............... | G06F 8/437 |
| | | | | 717/151 |
| 8,856,724 B2* | 10/2014 | Somani | ..................... | G06F 8/30 |
| | | | | 717/101 |
| 8,954,939 B2* | 2/2015 | Mameri | .................. | G06F 8/427 |
| | | | | 717/140 |
| 9,652,207 B2* | 5/2017 | Hoban | .................... | G06F 8/437 |

OTHER PUBLICATIONS

Aiken et al, "Type Inclusion Constraints and Type Inference", ACM, pp. 31-41 (Year: 1993).*

Chang et al, "The Impact of Optional Type Information on JIT Compilation of Dynamically Typed Languages"<ACM, pp. 13-24 (Year: 2011).*

League at al, "Type-Preserving Compilation of Featherweight Java", ACM, pp. 112-152 (Year: 2002).*

Chandra et al, "Type Inference for Static Compilation of JavaScript", ACM, pp. 410-429 (Year: 2016).*

Khatchadourian et al, "Automated Refactoring of Legacy Java Software to Enumerated Types", IEEE, pp. 224-233 (Year: 2007).*

* cited by examiner

QUALITY CHECKING INFERRED TYPES IN A SET OF CODE

INCORPORATION BY REFERENCE

Each of the following applications are hereby incorporated by reference: application Ser. No. 13/779,536, filed on Feb. 27, 2013, issued as U.S. Pat. No. 9,557,974. The Applicant hereby rescinds any disclaimer of claim scope in the parent applications or the prosecution history thereof and advises the USPTO that the claims in this application may be broader than any claim in the parent applications.

TECHNICAL FIELD

The present disclosure relates to quality checking a set of code. In particular, the present disclosure relates to quality checking inferred types in a set of code.

BACKGROUND

A compiler converts source code, which is written according to a specification directed to the convenience of the programmer, to machine or object code. Machine or object code is executable directly by the particular machine environment. Alternatively, a compiler converts source code to an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
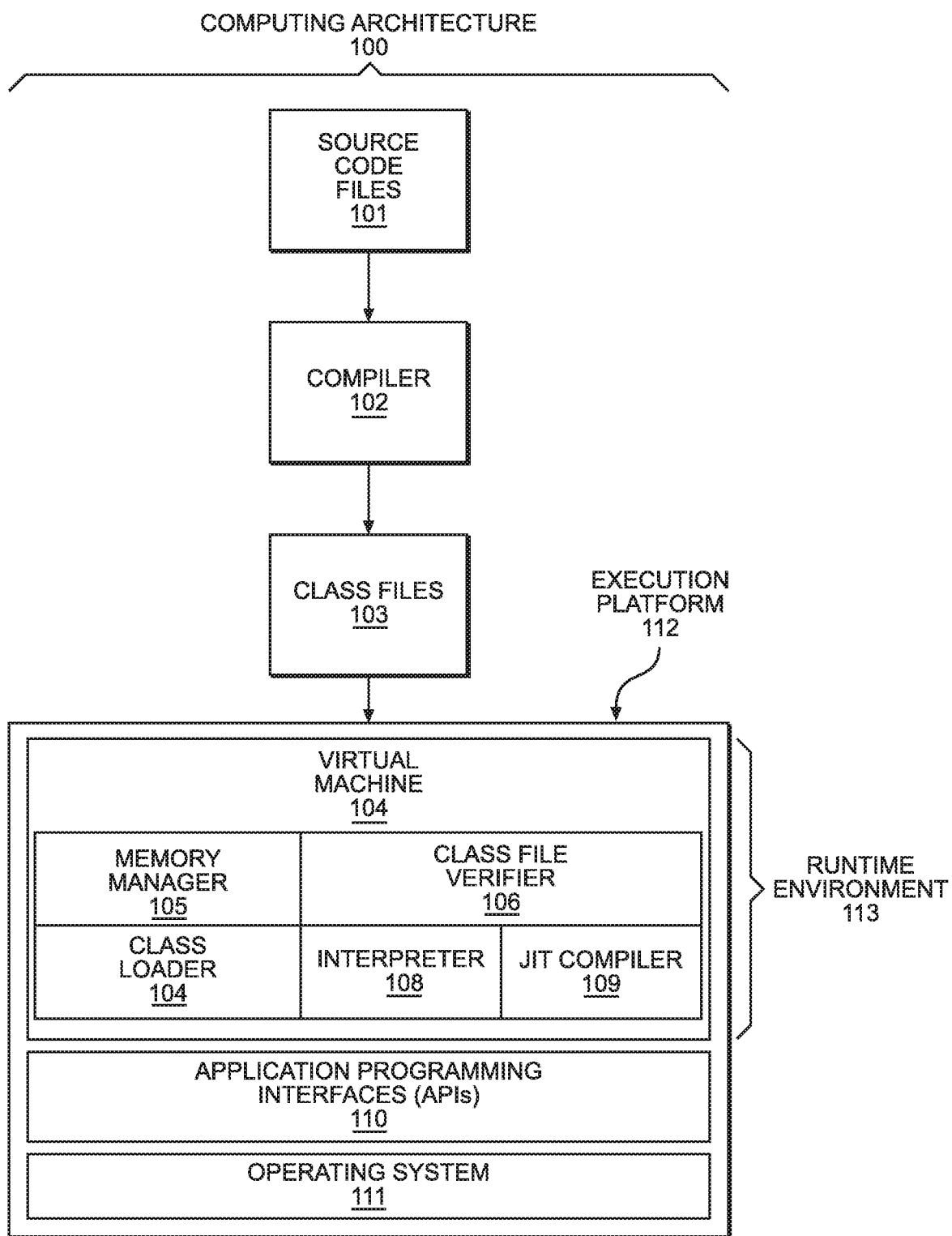
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. AN ANNOTATED TREE REPRESENTATION OF A SET OF CODE
4. QUALITY CHECKING SYSTEM ARCHITECTURE
5. QUALITY CHECKING INFERRED TYPES
6. MISCELLANEOUS; EXTENSIONS
7. HARDWARE OVERVIEW

1. General Overview

One or more embodiments include quality checking for a set of code. A compiler and/or integrated development environment (IDE) performs quality checking to check whether types used within a set of code satisfy certain quality conditions that affect the executability, readability, usability, and/or any other quality of the set of code. Quality conditions may include, for example, requiring that a type be accessible, requiring that a type not be deprecated, and requiring a type used in a non-test environment not be restricted to test environments. The compiler and/or IDE causes presentation of errors and/or warnings on a user interface based on any unsatisfied quality conditions. An unsatisfied quality condition may but does not necessarily prohibit a set of code from being compiled. While the Specification may refer to a "compiler" as performing the operations herein for quality checking, a compiler, an IDE, and/or other software and/or hardware may be used to perform such quality checking.

Quality checking is performed for a set of constructs specified in a set of code by traversing through an annotated tree representation of the set of code. Each node in the annotated tree representation represents a construct in the code. Where the code specifies an explicit type for a particular construct, the node representing the particular construct is annotated with the explicit type. Where the code does not specify an explicit type for a particular construct, a type is inferred for the construct. If the inferred type is denotable, the node representing the particular construct is annotated with the inferred type. Else if the inferred type is non-denotable, the node representing the particular construct is annotated with information indicating that the particular construct is associated with a non-denotable type. Quality checking for the constructs is performed based on the type information as indicated by the annotations to the tree representation.

There is no requirement that a type of a construct have an external representation literally contained in a file. A "denotable type" refers to a type that is explicitly declared by a set of code. The set of code explicitly specifies a name for a denotable type. Conversely, a "non-denotable type" refers to a type that is not explicitly declared by a set of code that is being compiled and/or analyzed. The set of code does not explicitly specify any name for a non-denotable type.

One or more embodiments include quality checking for types, in a set of code, that are inferred and denotable. As described above, where the code does not specify an explicit type for a particular construct, type inference is performed to infer a type for the construct. If the inferred type is denotable, the compiler performs quality checking for the construct by evaluating quality conditions with respect to the inferred type. Quality checking is performed as if an explicit type had been specified, but using the inferred type instead. The compiler generates errors and/or warnings for the construct based on any unsatisfied quality conditions for the inferred type.

One or more embodiments include quality checking for types, in a set of code, that are inferred and non-denotable. As described above, where the code does not specify an explicit type for a particular construct, type inference is performed to infer a type for the construct. If the inferred type is non-denotable, the compiler identifies one or more "target types" for evaluating quality conditions, based on an attribute of the non-denotable type. The compiler performs quality checking for the construct by evaluating quality conditions with respect to the target types. The compiler generates errors and/or warnings for the construct based on any unsatisfied quality conditions for the target types.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
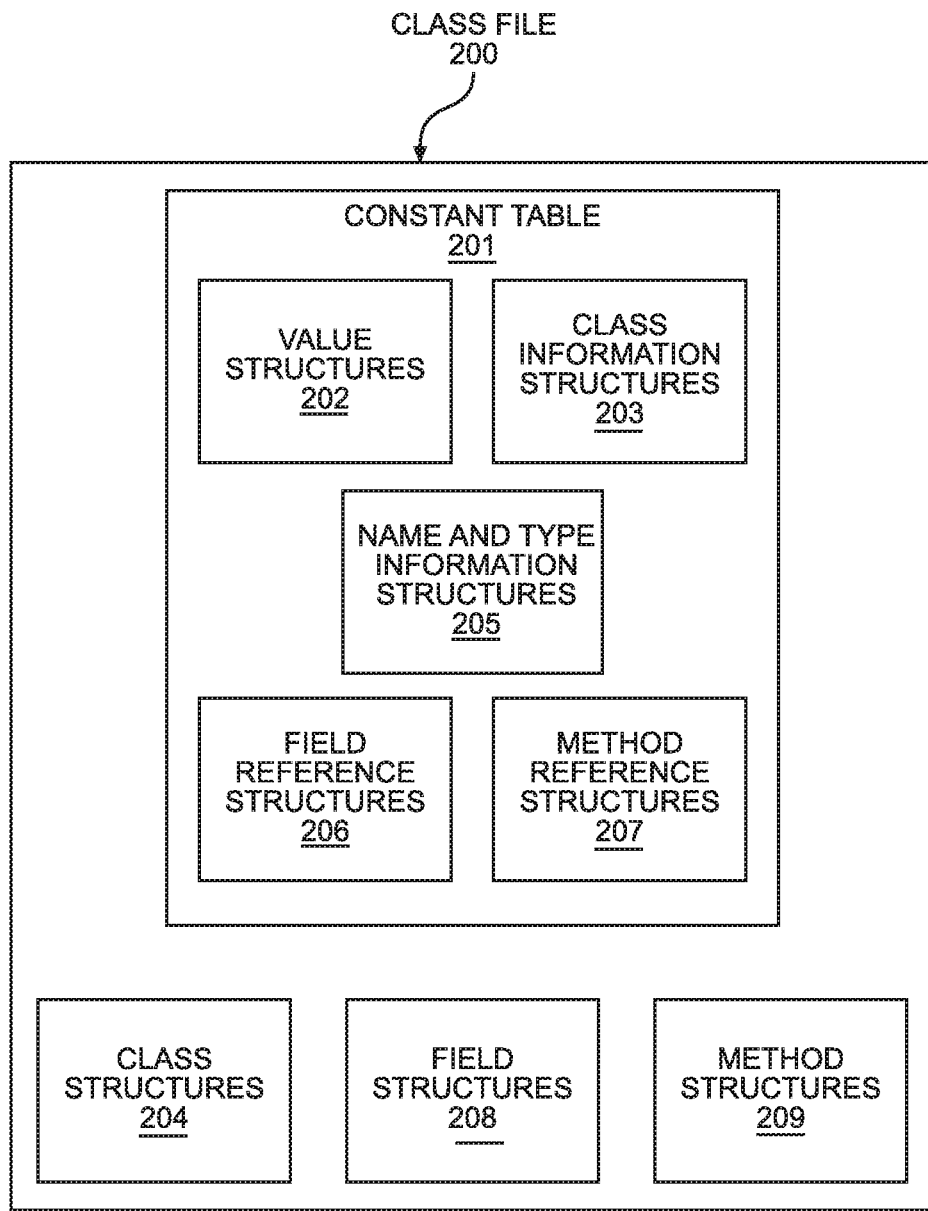
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:
   class A
   {
     int add12 and13( ){
       return B.addTwo(12, 13);
     }
   }

In the above example, the Java method add12 and13 is defined in class A, takes no parameters, and returns an integer. The body of method add12 and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
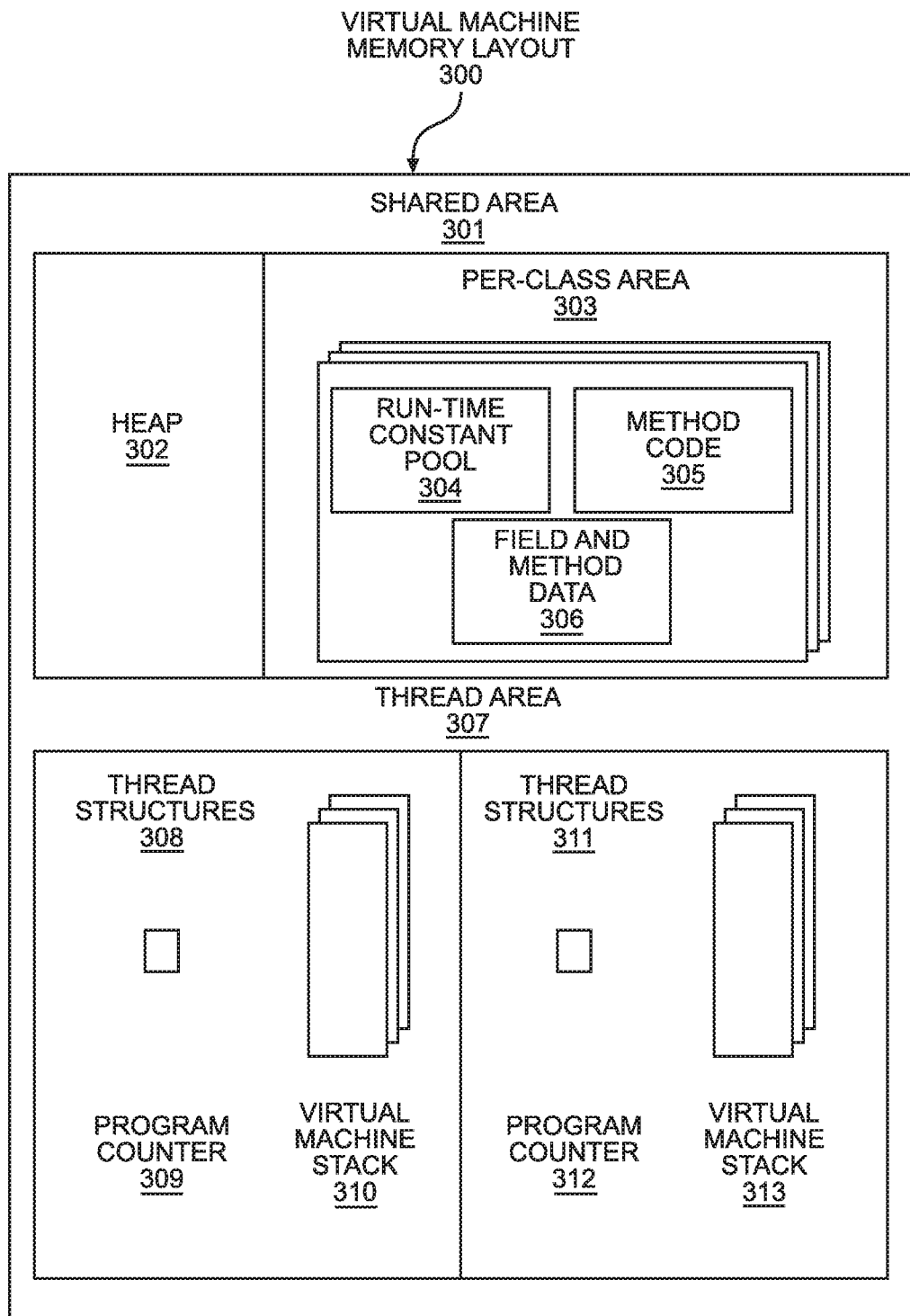
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
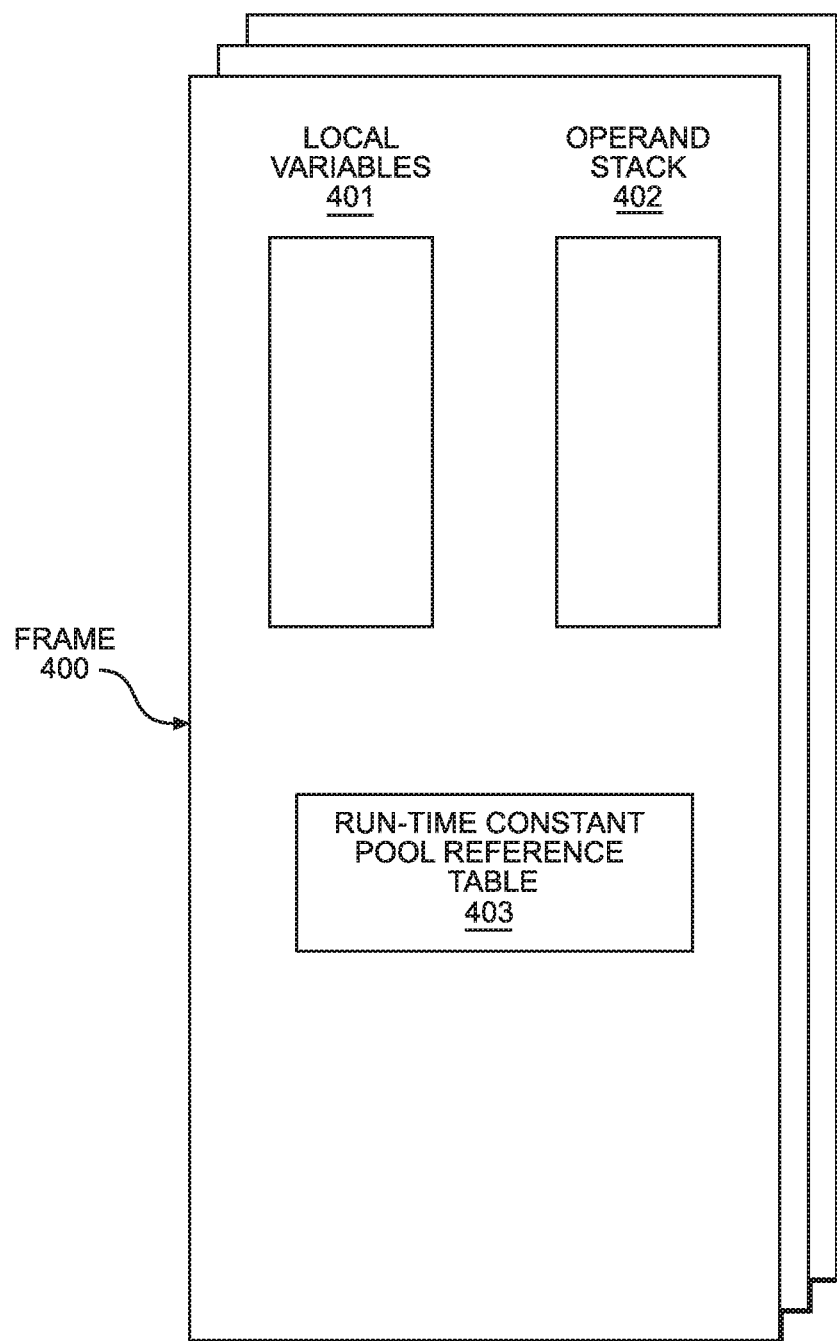
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class.

For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. An Annotated Tree Representation of a Set of Code

A compiler and/or IDE generates a tree representation of a set of code. A compiler and/or IDE may use the tree representation to perform semantic analysis of the code, where the compiler and/or IDE checks for correct usage of the code elements based on the programming language. A complete traversal of the tree representation verifies the correctness of the set of code. Additionally or alternatively, a compiler may use the tree representation as a basis for translating the code into machine or object code, or an intermediate representation (such as bytecode). Examples of tree representations include an abstract syntax tree (AST), and a concrete syntax tree (also referred to as a "parse tree").

Figure 5:
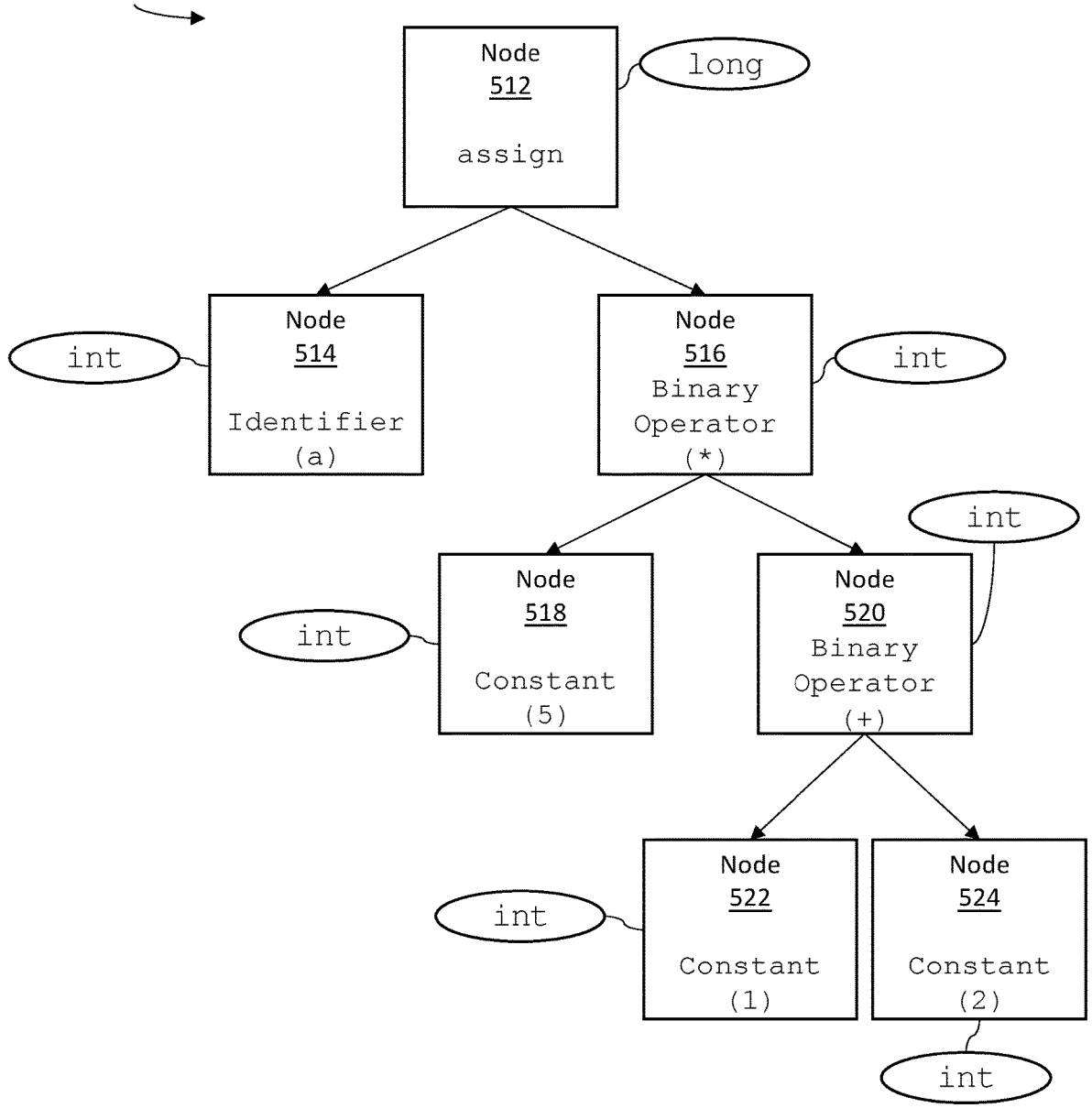
FIG. 5 illustrates an example tree representation of a set of code according to an embodiment.

FIG. 5 illustrates an example tree representation of a set of code according to an embodiment. A set of code 502 states: long a=5*(1+2).

A compiler and/or IDE performs syntax analysis on the code 502. Syntax analysis may involve, for example, scanning the text of the code 502, identifying tokens within the code 502, and parsing the tokens to generate a tree representation of the code 502. Based on the syntax analysis, the compiler and/or IDE obtains the structure of a tree representation.

As illustrated, the structure of the tree representation 504 for the code 502 includes nodes 512-524. Interior nodes (such as nodes 512, 516, 520) represent operators and/or operations. Leaf nodes that are children of an interior node represent operands of the operator and/or operation represented by the interior node.

Turning to the code 502, the code 502 includes the =symbol. A node 512 is generated in the tree representation 504 to represent the =symbol. The node 512 is labeled assign, corresponding to the meaning of the =symbol.

The code 502 includes the variable a on one side of the =symbol, and the expression (1+2) on the other side of the =symbol. A node 514 is generated as a child of the node 512. The node 514 represents the identifier a, which is an operand of the assign operation.

Meanwhile, the expression 5*(1+2) needs to be further broken down. A node 516 is generated as a child of the node 512 to represent the binary operator *. The code 502 includes the constant 5 on one side of the * symbol, and the expression 1+2 on the other side of the * symbol. A node 518 is generated as a child of the node 516. The node 518 represents the constant 5, which is an operand of the binary operator *.

Meanwhile, the expression 1+2 needs to be further broken down. A node 520 is generated as a child of the node 516 to represent the binary operator+. The code 502 includes the constant 1 on one side of the + symbol, and the constant 2 on the other side of the + symbol. A node 522 is generated as a child of the node 520. The node 522 represents the constant 1, which is an operand of the binary operator+. A node 524 is generated as a child of the node 520. The node 524 represents the constant 2, which is another operand of the binary operator+.

Additionally, a compiler and/or IDE performs contextual analysis on the code 502. Contextual analysis may involve, for example, determining types corresponding to the operands in the code 502, or determining positions of the operands in the code 502. Based on the contextual analysis, the compiler and/or IDE obtains an annotated tree representation.

Turning to the code 502, the code 502 specifies an explicit type long for the variable a. Based on the explicit specification, the node 512 representing the assign operation is associated with the annotation long, and the node 514 representing the identifier a is associated with the annotation long.

Further, the code 502 includes the constants 5, 1, and 2. Each constant is analyzed to determine a type for the constant. The type of each constant is determined to be int. Hence, the node 516 representing the binary operator * is associated with the annotation int; the node 518 representing the constant 5 is associated with the annotation int; the node 520 representing the binary operator+ is associated with the annotation int; the node 522 representing the constant 1 is associated with the annotation int; and the node 524 representing the constant 2 is associated with the annotation int.

Therefore, the tree representation 504 is annotated with type information representing the code 502.

4. Quality Checking System Architecture

Figure 6A:
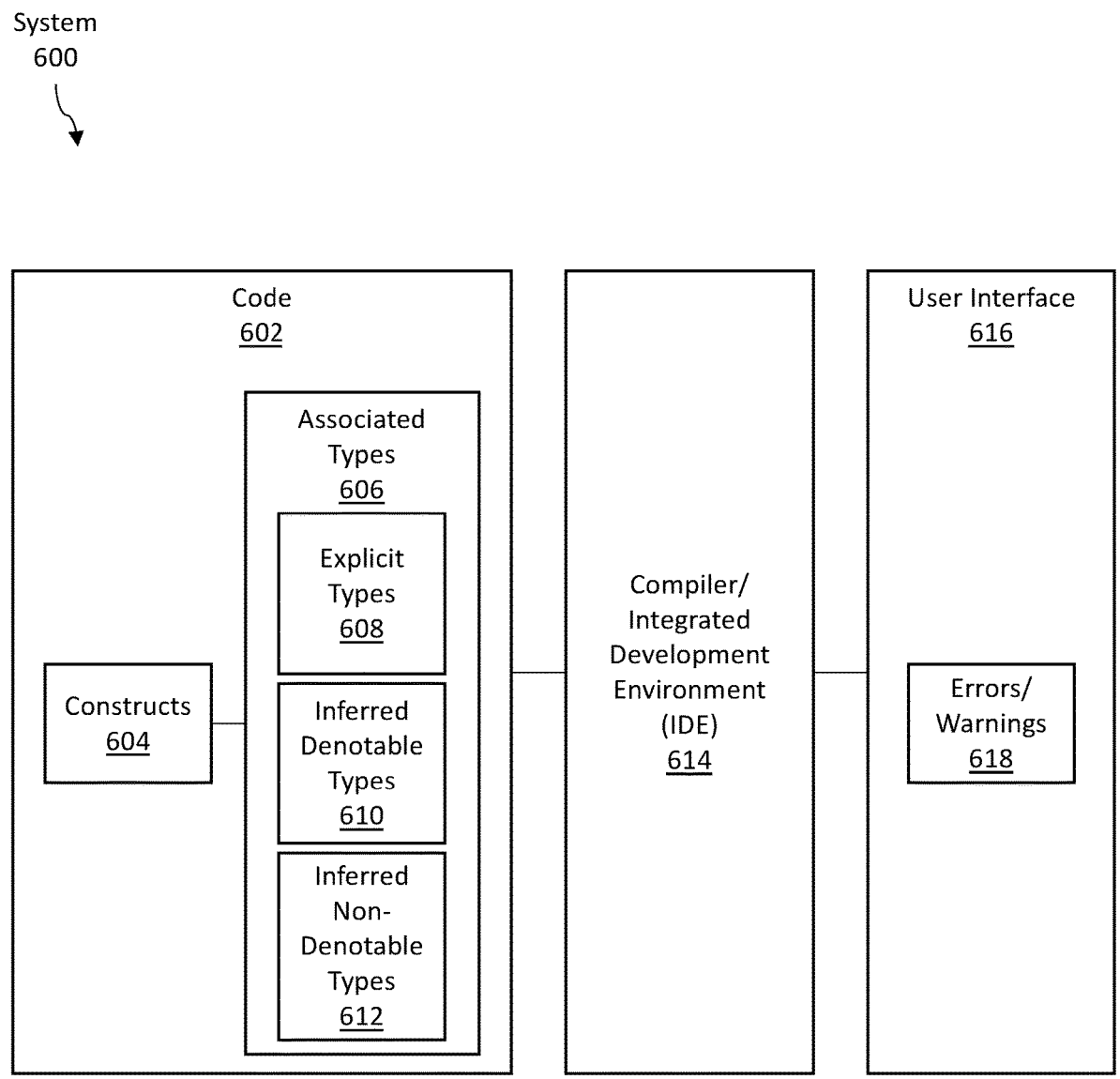
FIGS. 6A-B illustrate an example quality checking system according to an embodiment.
Figure 6B:
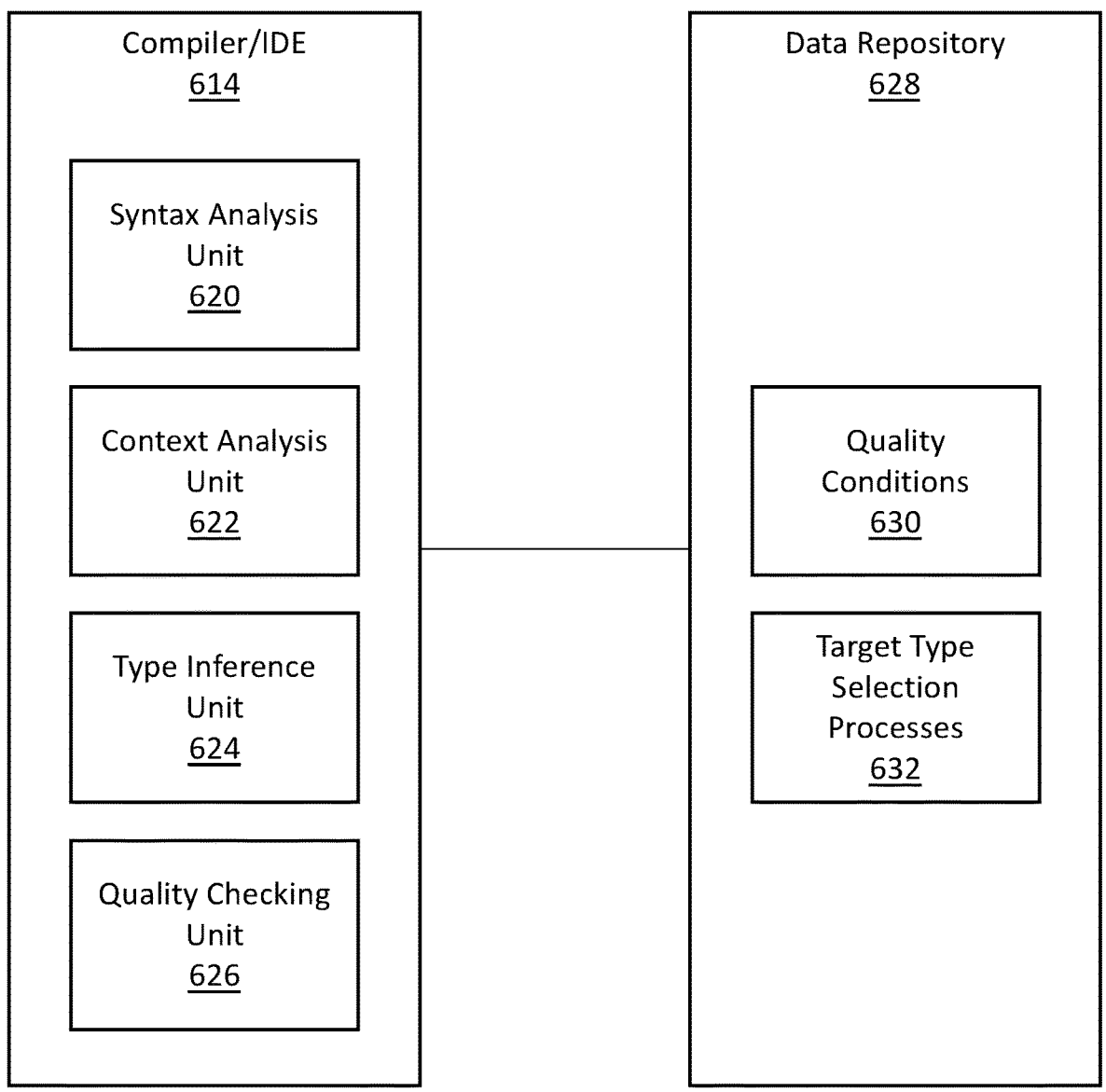

FIGS. 6A-B illustrate an example quality checking system according to an embodiment. As illustrated in FIG. 6A, a system 600 includes a set of code 602, a compiler and/or an integrated development environment (IDE) 614, and a user interface 616. In one or more embodiments, the system 600 may include more or fewer components than the components illustrated in FIG. 6A. The components illustrated in FIG. 6A may be local to or remote from each other. The components illustrated in FIG. 6A may be implemented in software and/or hardware. Each component may be distributed over multiple applications and/or machines. Multiple components may be combined into one application and/or machine. Operations described with respect to one component may instead be performed by another component.

In one or more embodiments, a set of code 602 includes a set of executable instructions written according to a programming language. A set of code 602 makes up the instructions necessary for executing a program that performs one or more specific functions. A set of code 602 includes all code that is observable to a compiler and/or IDE during a compilation process and/or analysis process.

In one or more embodiments, a construct 604 is an element in a set of code 602 that is associated with one or more types. Examples of constructs include a variable, a method, a class, and an interface.

In one or more embodiments, an associated type 606 is a type associated with a particular construct 604. Different categories of associated types 606 include explicit types 608 and inferred types. Inferred types can be further broken down into inferred denotable types 610, and inferred non-denotable types 612.

In one or more embodiments, an explicit type 608 is a type that is explicitly specified for a construct 604 by a set of code 602. An explicit type 608 is also a denotable type. A "denotable type" refers to a type that is explicitly declared by a set of code. The set of code explicitly specifies a name for a denotable type.

As an example, declaration statements may specify explicit types.

Example 1: Bar x=new Bar( );
Example 2: Bar x;

In Examples 1 and 2, the declaration statements explicitly specify a type for the variable x. Specifically, the text Bar x specifies a type for the variable x. Therefore, the type Bar may be referred to as an "explicit type" for the variable x.

Example 3: Foo doSomething (Bar x) { . . . };

In Example 3, the declaration statement explicitly specifies types for the method doSomething. Specifically, the text Foo appearing before the text doSomething indicates a return type for the method. The text Bar appearing within the parenthesis after the text doSomething indicates a parameter type for the method. Therefore, the types Foo and Bar may be referred to as "explicit types" for the method doSomething.

As another example, parameterization of a generic method, constructor, class, or interface may specify explicit types.

Example 4:
class Example 4 {
  <T, U>T doSomething(U x) { . . . }
  public static void main(String[ ] args) {
    Foo myResult=<Foo, Bar>doSomething(new Bar( ));
  }
}

In Example 4, the method doSomething is a generic method with type parameters T and U. The text <Foo, Bar>doSomething (new Bar( ))) parameterizes the generic method using the explicit type arguments <Foo, Bar>. Therefore, Foo may be referred to as an "explicit type" for the type parameter T, and Bar may be referred to as an "explicit type" for the type parameter U. Hence, the text new Bar( ), which inputs a value of Bar into the method doSomething is proper. The text Foo myResult=, which assigns an output of the method doSomething to a value of Foo is proper.

Example 5:
class Example 5<T>{
  T field;
  public static void main(String[ ] args) {
    Example 5<String>myExample5=new Example 5<String>( );
    String myString=myExample5.field;
  }
}

In Example 5, the class Example 5 is a generic class with type parameter T. The text Example 5<String>in the declaration statement parameterizes the generic class using the explicit type argument <String>. Additionally, the text Example 5<String>in the constructor parameterizes the generic class using the explicit type argument <String>. Therefore, String may be referred to as an "explicit type" for the type parameter T. Hence, the field field is of type String. The text String myString=, which assigns a value of the field field to a value of String is proper.

As another example, a lambda expression may specify explicit types for the parameters of the lambda expression.

Example 6:
```
class Example 6 {
   interface IntegerMath {
      int operation(int a);
   }
   public static void main(String [ ] args) {
      IntegerMath add1=(int a)→a+1;
   }
}
```

In Example 6, the text (int a)→a+1 is a lambda expression, wherein the type int is explicitly specified for the parameter a. Therefore, int may be referred to as an "explicit type" for the parameter a.

In one or more embodiments, an "inferred type" is a type that is not explicitly specified for a construct 604 by a set of code 602 but is rather inferred for the construct 604. An inferred type may be determined through a technique called "type inference."

Type inference may be decomposed into three processes: reduction, incorporation, and resolution.

Reduction takes a compatibility assertion about an expression or type, called a constraint formula, and reduces it to a set of bounds on inference variables. Often, a constraint formula reduces to other constraint formulas, which must be recursively reduced. A procedure is followed to identify these additional constraint formulas and, ultimately, to express via a bound set the conditions under which the choices for inferred types would render each constraint formula true.

Incorporation maintains a set of inference variable bounds, ensuring that these are consistent as new bounds are added. Because the bounds on one variable can sometimes impact the possible choices for another variable, this process propagates bounds between such interdependent variables.

Resolution examines the bounds on an inference variable and determines an instantiation that is compatible with those bounds. It also decides the order in which interdependent inference variables are to be resolved.

Further details regarding type inference are described in "Chapter 18, Type Inference," in JAVA LANGUAGE SPECIFICATION, Java SE 13 Edition (Aug. 21, 2019), which is enclosed herein as Appendix A and hereby incorporated by reference.

An inferred type may be denotable or non-denotable. As described above, a "denotable type" refers to a type that is explicitly declared by a set of code. The set of code explicitly specifies a name for a denotable type. Conversely, a "non-denotable type" refers to a type that is not explicitly declared by a set of code that is being compiled and/or analyzed. The set of code does not explicitly specify any name for a non-denotable type. A compiler and/or IDE 614 analyzing a set of code 602, for purposes of quality checking and/or compiling, cannot find an explicit declaration of a non-denotable type. A compiler and/or IDE 614 analyzing a set of code 602, for purposes of quality checking and/or compiling, cannot find any name explicitly specified by the code 602 for a non-denotable type. As such, a compiler and/or IDE 614 creates an internal representation of a non-denotable type.

In one or more embodiments, an inferred denotable type 610 is a type that is inferred and denotable.

As an example, a declaration statement for a local variable might not specify an explicit type.

Example 7: var x=new Bar( );

In Example 7, the declaration statement uses an identifier var in place of explicitly specifying the type of the variable x. The use of the identifier var triggers type inference for the variable x based on an initializer associated with the variable x. As indicated, new Bar( ) is the initializer associated with the variable x. Therefore, Bar may be referred to as an "inferred denotable type" for the variable x.

Further details regarding local-variable type inference are described in Brian Goetz, "JEP 286: Local-Variable Type Inference," in OPENJDK (last updated Oct. 12, 2018), which is enclosed herein as Appendix B and hereby incorporated by reference.

As another example, parameterization of a generic method, constructor, class, or interface might not specify explicit types.

Example 8:
```
class Example 8 {
   <I, U>T doSomething(U x) { . . . }
   public static void main(String[ ] args) {
      Foo myResult=doSomething(new Bar( ));
   }
}
```

In Example 8, the method doSomething is a generic method with type parameters T and U. The text doSomething (new Bar( ))) invokes the generic method without any explicit type arguments. However, since the text new Bar( ) inputs a value of Bar into the method doSomething, the type parameter U may be inferred as Bar. Since the text Foo myResult=assigns an output of the method doSomething to a value of Foo, the type parameter T may be inferred as Foo. Therefore, Foo may be referred to as an "inferred denotable type" for the type parameter T, and Bar may be referred to as an "inferred denotable type" for the type parameter U.

Further details regarding local-variable type inference are described in "Type Inference," in JAVA TUTORIALS (last accessed Nov. 11, 2019), which is enclosed herein as Appendix C and hereby incorporated by reference.

As another example, a lambda expression might not specify explicit types for the parameters of the lambda expression.

Example 9:
```
class Example 9 {
   interface IntegerMath {
      int operation(int a);
   }
   public static void main(String[ ] args) {
      IntegerMath add1=a→a+1;
   }
}
```

In Example 9, the text a→a+1 is a lambda expression, wherein no type is explicitly specified for the parameter a. However, a type of a parameter of a lambda expression is inferred based on a type of a parameter of a single abstract method included in a target type for the lambda expression. Here, the text IntegerMath add1=assigns the lambda expression a→a+1 to the target type IntegerMath. The single abstract method int operation (int a) of the target type IntegerMath indicates that a type of the parameter of the single abstract method is int. Therefore, a type of the parameter of the lambda expression a→a+1 may be inferred as int, and int may be referred to as an "inferred denotable type" for the parameter a.

Further details regarding lambda expressions, target typing, and type inference are described in "State of the Lambda," Java SE 8 Edition (September 2013), which is enclosed herein as Appendix D and hereby incorporated by reference. Additional details are also described in application Ser. No. 13/779,536, filed on Feb. 27, 2013, which is hereby incorporated by reference.

In some embodiments, in an effort to achieve code clarity, a compiler and/or IDE 614 may generate a warning to remove explicit types, where those explicit types can be inferred. Referring back to Example 4, the compiler and/or IDE 614 may suggest removal of the text <Foo, Bar>appearing before doSomething (new Bar( ))). Complying with the suggestion would result in the code of Example 8, where Foo may be inferred for the type parameter T, and Bar may be inferred for the type parameter U. Similarly, referring back to Example 6, the compiler and/or IDE 614 may suggest removal of the text int in the lambda expression (int a)→a+1. Complying with the suggestion would result in the code of Example 9, where int may be inferred for the variable a.

In one or more embodiments, an inferred non-denotable type 612 is a type that inferred and non-denotable. Examples of inferred non-denotable types 612 include an anonymous type, an intersection type, a capture type, and a tuple type.

As an example, an anonymous type is a local type without a name. An anonymous type expression includes: the new operator; the name of an interface or class to implement or extend; parentheses including the arguments to a constructor, similar to a normal class instance creation expression; and a body, which is a class declaration body, including method declarations. The interface or class being implemented or extended may be referred to as a "super-type" of the anonymous type.

Example 10:
var x=new Bar( ){
 void m( ){ ... }
};

In Example 10, the name of an interface or class to extend is Bar. The type Bar may be referred to as a "super-type" of the anonymous type.

Further details regarding anonymous types are described in "Chapter 15, Expressions," in JAVA LANGUAGE SPECIFICATION, Java SE 13 Edition (Aug. 21, 2019), which is enclosed herein as Appendix E and hereby incorporated by reference. Specific details are within Section 15.9, Class Instance Creation Expressions of the reference.

As another example, an intersection type is a form of a generic type that implements and/or extends multiple interfaces and/or classes. The interfaces and/or classes may be referred to as "components" of the intersection type. Methods available to the intersection type includes the union of the methods available to each of the components of the intersection type.

Example 11:
var myList=List.of (1, "two", 3);

In Example 11, the compiler and/or IDE performs a series of analysis on the type of the variable myList. First, the type of the variable myList must be an Object. Second, at least one element of myList is an int, and at least one element of myList is a String. Since the types int and String implement Comparable and Serializable, the type of the variable myList must also implement Comparable and Serializable. Therefore, the type of the variable myList may be considered as List<Object & Comparable & Serializable>. The types Object, Comparable, and Serializable may be referred to as the "components" of the intersection type of the variable myList.

Further details regarding anonymous types are described in "Chapter 14, Types, Values, and Variables," in JAVA LANGUAGE SPECIFICATION, Java SE 13 Edition (Aug. 21, 2019), which is enclosed herein as Appendix F and hereby incorporated by reference. Specific details are within Section 4.9, Intersection Types of the reference.

As another example, a capture type is a type resulting from the use of a wildcard ?. A capture type is associated with a set of "bounds." If the wildcard expression does not explicitly include any bounds, the upper bound of the capture type may be Object and the lower bound of the capture may be null. If the wildcard expression explicitly includes a bound (for example, <? extends Foo>), the upper bound of the capture type may be the explicitly-specified bound and the lower bound of the capture may be null.

Example 12:
List<? extends Foo>myList=List.of(1);
var x=myList.get(0);

In Example 12, the compiler and/or IDE internally generates a type for the variable myList, which may be denoted as Cap#1. A "bound" for Cap#1 may be determined as Foo.

Further details regarding capture types are described in "Chapter 5, Conversions and Contexts," in JAVA LANGUAGE SPECIFICATION, Java SE 13 Edition (Aug. 21, 2019), which is enclosed herein as Appendix G and hereby incorporated by reference. Specific details are within Section 5.1.10, Capture Conversion of the reference.

In one or more embodiments, a compiler and/or IDE 614 refers to hardware and/or software configured to perform operations described herein for quality checking a set of code 602. Examples of operations for quality checking a set of code are described below with reference to FIGS. 7-9.

In some embodiments, the compiler described with reference to FIG. 6 is similar to the compiler 102 of FIG. 1. The compiler 614 coverts a set of code 602 from one programming language to another programming language. In preparation for code conversion, the compiler 614 performs a number of operations. Such operations include generating of a tree representation of the set of code 602, as described above with reference to Section 3, and quality checking.

In some embodiments, the IDE described with reference to FIG. 6 is similar to the compiler described above, except that the IDE does not perform code conversion. The IDE generates a tree representation of a set of code 602, and performs quality checking. The code for performing tree representation generation and quality checking may but is not necessarily the same in each of the compiler and the IDE.

In an embodiment, a compiler and/or IDE 614 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

Further details regarding a compiler and/or IDE 614 are described below with reference to FIG. 6B.

In one or more embodiments, a user interface 616 refers to hardware and/or software configured to facilitate communications between a user and a compiler and/or IDE 614. A user interface 616 renders user interface elements to present information to a user and/or to receive user input from a user. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In one or more embodiments, an error and/or warning 618 is a communication from a compiler and/or IDE 614 to a user indicating that one or more quality conditions, of a quality checking process, is not satisfied. An error and/or warning 618 may but does not necessarily identify which quality conditions are not satisfied. An error and/or warning 618 may but does not necessarily identify which position within a set of code 602 failed to satisfy a quality condition. In some embodiments, an error prevents successful compilation of a set of code 602, while a warning does not prevent successful compilation of a set of code 602. Which quality conditions are mandatory and thereby generate errors, and which quality conditions are recommended and thereby generate warnings, may be established by the program of a compiler and/or IDE 614. Additionally or alternatively, which quality conditions are mandatory and thereby generate errors, and which quality conditions are recommended and thereby generate warnings, may be customizable by a user. As further used herein, the terms "error" and "warning" are interchangeable.

Referring to FIG. 6B, a compiler and/or IDE 614 includes a syntax analysis unit 620, a context analysis unit 622, a type inference unit 624, and a quality checking unit 626.

In one or more embodiments, a syntax analysis unit 620 is configured to perform syntax analysis on a set of code 602 to generate a structure of a tree representation, as described above with reference to Section 3. A context analysis unit 622 is configured to analyze the context within a set of code 602 to annotate a tree representation, as described above with reference to Section 3. The context analysis unit 622 adds annotations to nodes of the tree representation to indicate types associated with the constructs 604 represented by the nodes. A type inference unit 624 is configured to perform type inference to infer types associated with constructs 604. A quality checking unit 626 is configured to perform quality checking for constructs 604 and associated types 606.

In one or more embodiments, a data repository 628 is any type of storage unit and/or device (e.g., a file system, database, collection of tables, or any other storage mechanism) for storing data. Further, a data repository 628 may include multiple different storage units and/or devices. The multiple different storage units and/or devices may or may not be of the same type or located at the same physical site. Further, a data repository 628 may be implemented or executed on the same computing system as a compiler and/or IDE 614. Alternatively or additionally, a data repository 628 may be implemented or executed on a computing system separate from a compiler and/or IDE 614. The data repository 628 may be communicatively coupled to the compiler and/or IDE 614 via a direct connection or via a network.

Information describing quality conditions 630 and/or target type selection processes 632 may be implemented across any of components within the system 600. However, this information is illustrated within the data repository 628 for purposes of clarity and explanation.

In one or more embodiments, a quality condition 630 is a condition related to the executability, readability, usability, and/or any other quality of the set of code. Examples of quality conditions for a type used in a set of code 602 include:
- a condition requiring that a type is not deprecated;
- a condition requiring that a type is not a "raw type" (for example, not allowing references to generic types without any type arguments);
- a condition requiring that a type is not restricted for test use;
- a condition requiring that a type is observable;
- a condition requiring that a type is readable;
- a condition requiring that a type is accessible;
- a condition requiring that a type is "well formed" (for example, requiring that a type argument to a generic type conforms to the bounds declared in the generic class declaration).

As an example, the following code includes using a deprecated type, as indicated by the text @Deprecated.

Example 13:
@Deprecated
class DeprecatedFoo {
  void foo( ){ }
}
class Example 13 {
  @SuppressWarnings("deprecation")
  static DeprecatedFoo newDeprecatedFoo( ){
    return new DeprecatedFoo( );
  }
  void example13( ){
    DeprecatedFoo foo=newDeprecatedFoo( );
  }
}

In Example 13, based on the declaration statement DeprecatedFoo foo, a compiler may determine that the construct foo is associated with the type DeprecatedFoo. The compiler may determine that the class DeprecatedFoo has been deprecated. The compiler may thereby determine that a quality condition requiring types not be deprecated is not satisfied. The compiler may issue an error and/or warning based on the unsatisfied quality condition.

In some embodiments, a quality condition is checked at a declaration site. The check is performed when a new program element is being introduced for the first time (such as a variable declaration, method declaration, class declaration). Such checks are referred to as "declaration-site checks." Declaration-site checks generally generate a single error and/or warning per triggering program element, at the location where the program element is introduced. Declaration-site checks generally do not generate errors and/or warnings for subsequent uses of the program element. Further, declaration-site checks are generally implemented, using an annotated tree representation, based on the types as indicated by the annotations for the nodes of the tree representation.

In some embodiments, a quality condition is checked at a use site. The check is performed on each use of a program element. Such checks are referred to as "use-site checks." Use-site checks generally generate an error and/or warning for each incorrect use of the same program element. Hence, use-check checks may generate multiple errors and/or warnings associated with the same program element. Further, use-site checks are generally implemented based on the types (explicit or inferred) that are associated with the constructs 604 based on the set of code 602. As an example, a first set of operations may form a use-site check for a type Foo. A second set of operations (which may be related or unrelated to the first set of operations) may form a use-site check for another type Bar. If a particular portion of code associates the type Foo with a variable x, then a compiler employs the first set of operations to perform a use-site check on the type of the variable x. However, if the particular portion of code associates the type Bar with the variable x, then the compiler employs the second set of operations to perform a use-site check on the type of the variable x.

In one or more embodiments, a target type selection process 632 includes a set of operations for selecting one or more target types associated with an inferred non-denotable type 612 of a construct 604. A target type is a denotable type that is used, in lieu of an inferred non-denotable type of a particular construct 604, for evaluating a quality condition 630 associated with the particular construct 604.

In some embodiments, a data repository 628 includes a candidate set of target type selection processes 632. Each of the candidate set of target type selection processes are associated with one or more attributes of inferred non-denotable types 612. An attribute of an inferred non-denotable type 612 may include a category of the inferred non-denotable type. Additionally or alternatively, an attribute of an inferred non-denotable type 612 may include other characteristics, such as whether an inferred non-denotable type 612 is associated with a super-type, whether an inferred non-denotable type 612 is associated with multiple components that are denotable types, whether an inferred non-denotable type 612 is associated with a bound, and/or whether an inferred non-denotable type 612 is associated with a particular group or sequence of denotable types. Where a particular construct 604 is associated with an inferred non-denotable type 612, a target type selection process is selected, from the candidate set of target type selection processes, based on one or more attributes of the inferred non-denotable type 612.

As an example, categories of inferred non-denotable types may include anonymous types, intersection types, and capture types. A data repository associated with a compiler and/or IDE may store three candidate target type selection processes, each associated with a respective non-denotable type category.

A target type selection process for anonymous types may include identifying a super-type of an anonymous type. A compiler and/or IDE analyzes the anonymous type expression in the code to determine the name of the interface or class being implemented or extended by the anonymous type. The interface or class being implemented or extended is the super-type of the anonymous type. The super-type is then used as a "target type" for the anonymous type.

A target type selection process for intersection types may include identifying components of an intersection type. A compiler and/or IDE analyzes assignment statements in the code to determine the values of the variable of the intersection type. The interfaces and/or classes implemented and/or extended by the values are the components of the intersection type. Each component is then used as a "target type" for the intersection type.

A target type selection process for capture types may include identifying bounds of a capture type. A compiler and/or IDE analyzes the wildcard expression in the code to determine the bounds of the capture type. An upper bound of the capture type is explicitly specified in the wildcard expression, or otherwise determined to be Object. A lower bound of the capture type is determined to be null. Each bound is then used as a "target type" for the capture type.

5. Quality Checking Inferred Types

As described above, a compiler and/or IDE performs quality checking for a set of code. Hence, a compiler and/or IDE is configured to perform the operations of FIGS. 7-9. For the purposes of clarity, the below text describes the operations of FIG. 7-9 as being performed by a compiler. However, the operations of FIGS. 7-9 may be performed by an IDE, and/or any other hardware and/or software configured to perform quality checking for a set of code.

Figure 7:
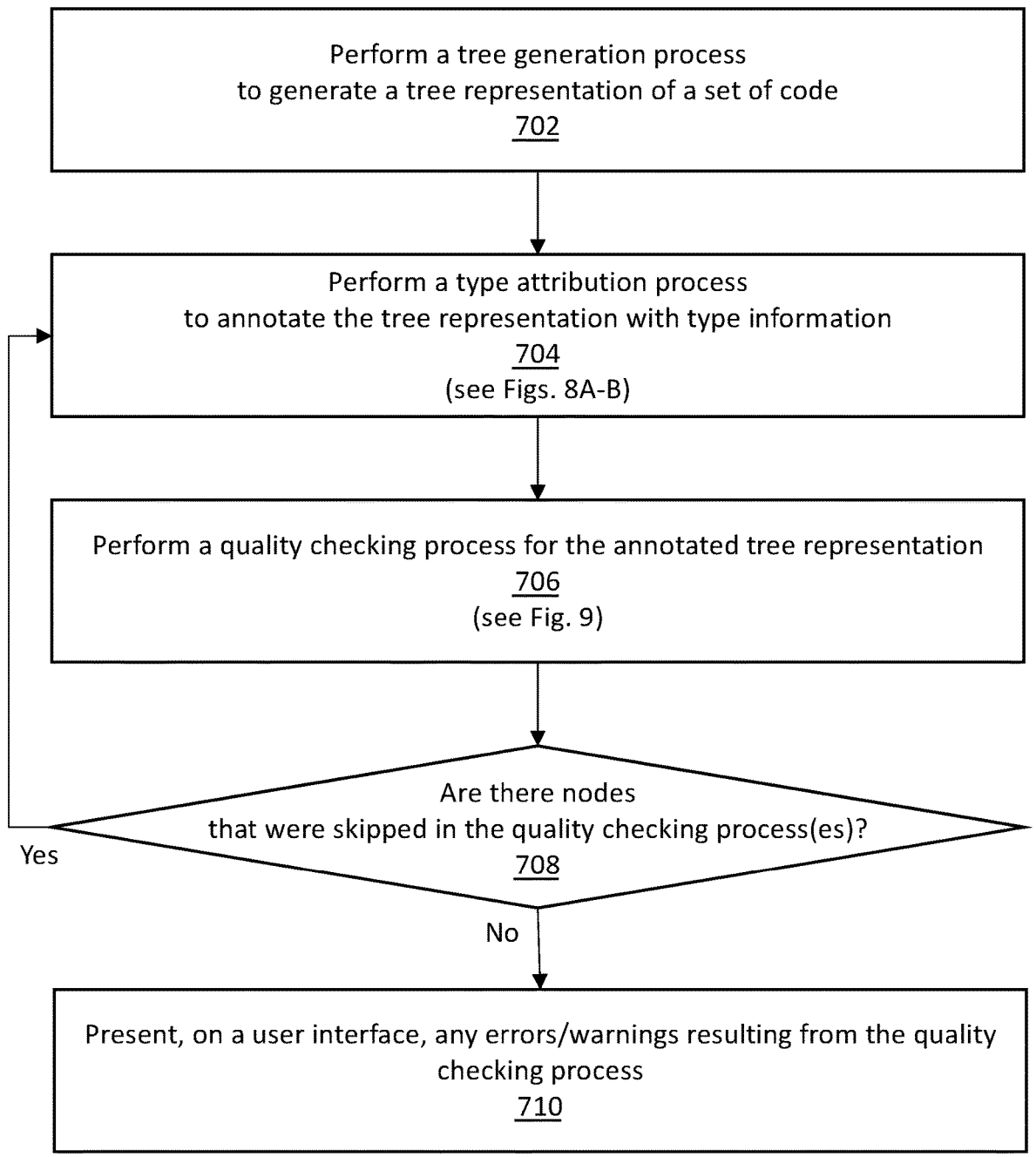
FIG. 7 illustrates an example set of operations for quality checking a set of code according to an embodiment.

FIG. 7 illustrates an example set of operations for quality checking a set of code according to an embodiment. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include performing a tree generation process to generate a tree representation of a set of code (Operation 702). A compiler receives user input identifying one or more sources storing code to be compiled. The identified sources may include code linking to other code stored at other sources. The compiler iteratively obtains all code that is identified and/or linked. The obtained code forms the set of code that is observable to the compiler. The compiler performs syntax analysis on the set of code to generate a structure of a tree representation of a set of code. The compiler generates a node for each construct identified in the set of code.

One or more embodiments include performing a type attribution process to annotate the tree representation with type information (Operation 704). The compiler performs a type attribution process to annotate the tree representation with type information. A type attribution process involves traversing through the nodes of the tree representation (generally from the root down to the leaves) and annotating each node where relevant identifiable information is determined. Type attribution processes may be iterated multiple times, such that the tree representation is traversed multiple times. A subsequent iteration of a type attribution process may fill in information gaps left open by a previous iteration of a type attribution process. An example set of operations for a type attribution process is described below with reference to FIG. 8A. An example set of operations for another type attribution process is described below with reference to FIG. 8B.

In some embodiments, different attribution processes may be performed for each iteration. For example, the compiler determines whether the attribution process illustrated in FIG. 8A has been performed. If the attribution process of FIG. 8A has not yet been performed, the compiler first performs the attribution process of FIG. 8A. Else if the attribution process of FIG. 8A has been performed, the compiler then performs the attribution process of FIG. 8B.

In some embodiments, a same attribution process may be performed for each iteration. For example, the operations of FIGS. 8A-B may be merged into one attribution process. The compiler may perform the operations of both FIGS. 8A-B in a single traversal of the tree representation.

One or more embodiments include performing a quality checking process for the annotated tree representation (Operation 706). The compiler performs a quality checking process for the tree representation that has been annotated with type information. A quality checking process involves traversing through the nodes of the tree representation (generally from the root down to the leaves) and evaluating quality conditions for each node where type information is available.

In some embodiments, the compiler performs a quality checking process after each iteration of a type attribution process. In some embodiments, the compiler performs a quality checking process after multiple iterations of one or more type attribution processes. In some embodiments, the compiler merges a type attribution process and a quality checking process, such that each node is checked for quality after being annotated with type information before another node is traversed.

One or more embodiments include determining whether there are any nodes that were skipped in the one or more previously-performed quality checking processes (Operation 708). The compiler determines whether the tree representation includes any nodes that were skipped in the one or more previously-performed quality checking processes. The compiler may determine whether any nodes were skipped in various ways. In some embodiments, if a node is not annotated with any type (whether explicit, inferred denotable, or inferred non-denotable), then the compiler determines that the node was skipped. Else if the node is annotated with a type, then the compiler determines that the node was not skipped. In some embodiments, each node is annotated with a flag indicating whether quality checking has been performed for the node. If the flag for a node indicates quality checking is not yet performed, then the compiler determines that the node was skipped. Else if the flag indicates quality checking has been performed, then the compiler determines that the node was not skipped. If one or more nodes were skipped, then the compiler repeats Operations 704-706.

Additionally or alternatively, the compiler determines whether there are any type attribution processes that still need to be performed. If there is a type attribution process to be performed, then the compiler repeats Operations 704-706. For example, the compiler may determine that available type attribution processes include (a) the type attribution process of FIG. 8A and (b) the type attribution process of FIG. 8B. The compiler may determine that the type attribution process of FIG. 8A has been performed and the type attribution process of FIG. 8B has not yet been performed. Based on the determination, the compiler repeats Operation 704 to perform the type attribution process of FIG. 8B. The compiler then repeats Operation 706 to perform quality checking based on the new type information derived from the type attribution process of FIG. 8B.

In one or more embodiments, the sequence of Operations 704-706 is not critical. Operation 704 and Operation 706 may be performed sequentially per node. Alternatively, Operation 704 may be iterated until all nodes are annotated, before the first performance of Operation 706.

One or more embodiments include presenting, on a user interface, any errors and/or warnings resulting from the quality checking process (Operation 710). The compiler causes a user interface to present any errors resulting from the quality checking process. The error message may indicate a type of error that occurred. As an example, an error message may state, "'DeprecatedFoo' is deprecated." The error message may indicate an attribute of the type associated with the error. As an example, an error message may state, "Inferred type 'DeprecatedFoo' is deprecated," or "Target type 'DeprecatedFoo' of anonymous type is deprecated."

In some embodiments, the user interface concurrently presents (a) an error message and (b) a portion of the set of code associated with the error. As presented on the user interface, the error message may be aligned with the code portion causing the error. Additionally or alternatively, the user interface presents a marker to indicate a position within the code portion causing the error.

If the error is associated with an explicit type, then the compiler determines a position in the code that explicitly specifies the explicit type. The user interface presents a marker at the position to indicate that the marked portion of code has caused the error.

If the error is associated with an inferred type (denotable or non-denotable), then there does not exist any position in the code explicitly specifying the type. Hence, the marker cannot be presented at any position in the code that explicitly specifies the type. Rather, the compiler determines a position in the code that would have explicitly specified the type. The position may be, for example, a position immediately preceding a construct associated with the inferred type. The user interface presents a marker at the position to indicate that the marked portion of code is related to causing the error.

As an example, a set of code may include an inferred type in a declaration statement.

Example 14:

var x=new DeprecatedFoo ( );

The above code may cause an error because the class DeprecatedFoo is deprecated. If an explicit type were specified for the variable x, then DeprecatedFoo would appear in the place of var, such that the statement would be DeprecatedFoo x=new DeprecatedFoo ( ); . Therefore, the beginning of the text var may be marked to identify the portion of code related to causing an error.

As another example, a set of code may include an inferred type in a lambda expression.

Example 15:

```
class Example 15 {
   @SuppressWarnings("deprecation")
   static List<DeprecatedFoo>newListOfDeprecatedFoos(
      ){
      return List.of(new DeprecatedFoo( );
   }
   void example15( ){
   List<String>1=newListOfDeprecatedFoos( )
      .stream ( )
      .map (x→x.toString ( ))
      .collect (Collectors.toList ( ));
   }
}
```

The above code may cause an error because the class DeprecatedFoo is deprecated. If an explicit type were specified for the variable x, then DeprecatedFoo would appear in front of the variable x, such that the lambda expression would be (DeprecatedFoo x)→x.toString( ). Therefore, the parenthesis before the parameter x, or the parameter x itself, may be marked to identify the portion of code related to causing an error.

As another example, a set of code may include an inferred type in a parameterized generic method.

Example 16:

```
class Example 16 {
   @SuppressWarnings ("deprecation")
   static DeprecatedFoo newDeprecatedFoo( ){
      return new DeprecatedFoo( );
   }
   static <I>T methodAcceptingT(T t) {
      return t;
   }
   void example16( ){
      Example 16.methodAcceptingT(newDeprecatedFoo(
         ));
   }
}
```

The above code may cause an error because the class DeprecatedFoo is deprecated. If an explicit type were specified for the variable x, then DeprecatedFoo would appear in front of the method methodAcceptingT, such that the statement would be:

Example 16.<DeprecatedFoo>methodAcceptingT(newDeprecatedFoo( );

Therefore, the period before the method methodAcceptingT, or the beginning of the method methodAcceptingT itself, may be marked to identify the portion of code related to causing an error.

Additionally or alternatively, if the error is associated with an inferred non-denotable type, then the compiler identifies the target type causing the error, and determines a position in the code that provides information for identifying the target type. The user interface presents a marker at the position to indicate that the marked portion of code is related to causing the error.

Referring to Example 10 above, an anonymous type is shown. The target type Bar of the anonymous type may cause an error. A portion of the code that provides information for identifying the target type Bar is the initializer Bar( ). Therefore, the beginning of the initializer Bar( ) may be marked to identify the portion of code related to causing an error.

Referring to Example 11, an intersection type is shown. The intersection type is List<Object & Comparable & Serializable>. The target type Comparable of the intersection type may cause an error. A portion of the code that provides information for identifying the target type Comparable is the value 1. Therefore, the value 1 may be marked to identify the portion of code related to causing an error.

Referring to Example 12, a capture type is shown. The capture type is bound by the types Foo and null. The target type Foo of the capture type may cause an error. A portion of the code that provides information for identifying the target type Foo is the wildcard expression ? extends Foo. Therefore, the text Foo, or the wildcard ?, may be marked to identify the portion of code related to causing an error.

Figure 8A:
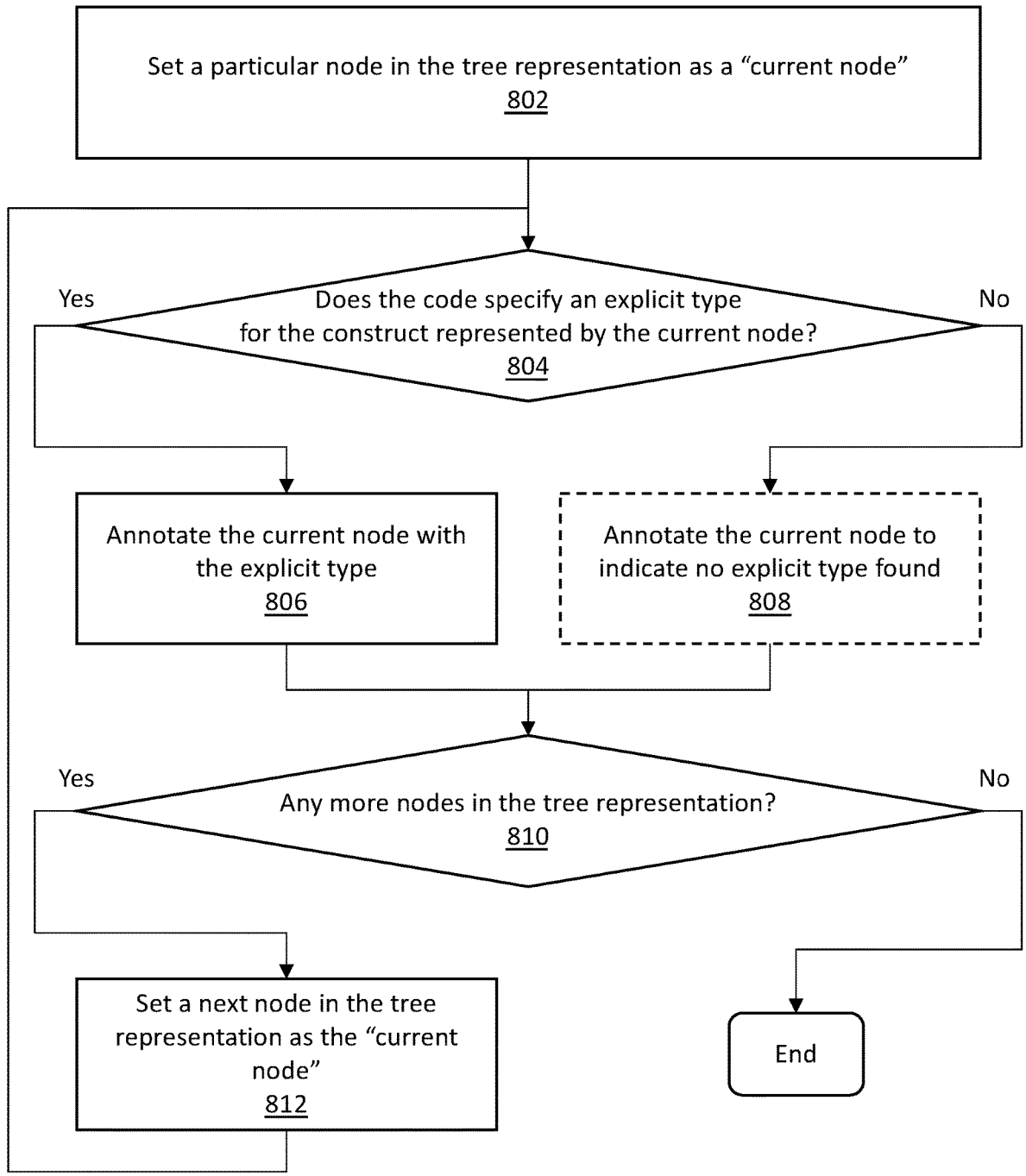
FIGS. 8A-B illustrates example sets of operations for type attribution processes for a tree representation of a set of code according to an embodiment.

FIG. 8A illustrates an example set of operations for a type attribution process for a tree representation of a set of code according to an embodiment. One or more operations illustrated in FIG. 8A may be modified, rearranged, or omitted all together. Accordingly, the particular sequence of operations illustrated in FIG. 8A should not be construed as limiting the scope of one or more embodiments.

One or more embodiments include setting a particular node in the tree representation as a "current node" (Operation 802). A compiler begins traversal of a tree representation. The compiler sets a particular node in the tree representation as a "current node." The compiler may initially set, for example, the root of the tree representation as the "current node," such that the tree representation is traversed from the top down.

One or more embodiments include determining whether the code specifies an explicit type for the construct represented by the current node (Operation 804). The compiler analyzes the code surrounding the construct represented by the current node. The compiler determines whether the surrounding code explicitly specifies a type for the construct. If the surrounding code explicitly specifies a type, then there is an explicit type for the construct. If the surrounding code does not explicitly specify a type, then there is no explicit type for the construct.

Referring back to Example 1, during tree representation generation, a compiler may generate an interior node representing the assign operation. The compiler may further generate two child nodes. On the left, the child node may represent the construct x. On the right, the child node may represent the construct new Bar( ). The compiler may analyze the tree representation from left to right. The compiler may analyze code surrounding the construct x represented by the left child node. Based on the text Bar preceding the text x, the compiler may determine that the construct x is associated with an explicit type, and that the explicit type is Bar.

Referring back to Example 7, during tree representation generation, a compiler may generate an interior node representing the assign operation. The compiler may further generate two child nodes. On the left, the child node may represent the construct x. On the right, the child node may represent the construct new Bar(). The compiler may analyze the tree representation from left to right. The compiler may analyze code surrounding the construct x represented by the left child node. Based on the text var preceding the text x, the compiler may determine that the construct x is not associated with an explicit type.

If the code specifies an explicit type, then one or more embodiments include annotating the current node with the explicit type (Operation 806). The compiler associates the current node with an annotation that indicates that the construct represented by the current node is associated with the explicit type. As an example, a compiler may determine that a set of code explicitly specifies the type Bar for the variable x. A compiler may associate a node representing the variable x with an annotation indicating the type Bar.

If the code does not specify an explicit type, then one or more embodiments include annotating the current node to indicate that no explicit type is found (Operation 808). The compiler associates the current node with an annotation that indicates that no explicit type is found. As an example, a compiler may determine that a set of code does not explicitly specify any type for the variable x. A compiler may associate a node representing the variable x with an annotation indicating, "No explicit type found."

In an alternative embodiment, if the code does not specify an explicit type, then the current node may simply remain unannotated. Optionally, the compiler may maintain a "To Review" list in a data repository. The compiler may store an identifier of the current node in the "To Review" list.

One or more embodiments include determining whether there are any more nodes in the tree representation to traverse (Operation 810). The compiler determines whether there are any more nodes in the tree representation to traverse. For example, the compiler may determine whether the current node has any child node. Additionally or alternatively, the compiler may determine whether any other previously-traversed nodes have any child node. If a current node or previously-traversed node has a child node, then there are more nodes to traverse.

One or more embodiments include setting a next node in the tree representation as the "current node" (Operation 812). The compiler sets a next node in the tree representation as the "current node." The next node may be, for example, a child node of the current node; a child node of another previously-traversed node; or a sibling node of the current node or another previously-traversed node.

If the current node and previously-traversed nodes do not have any child nodes, then there are no more nodes to traverse, and the type attribution process ends. After all nodes in the tree representation are traversed, the compiler may optionally store an indication indicating that the type attribution process of FIG. 8A has been performed.

Figure 8B:
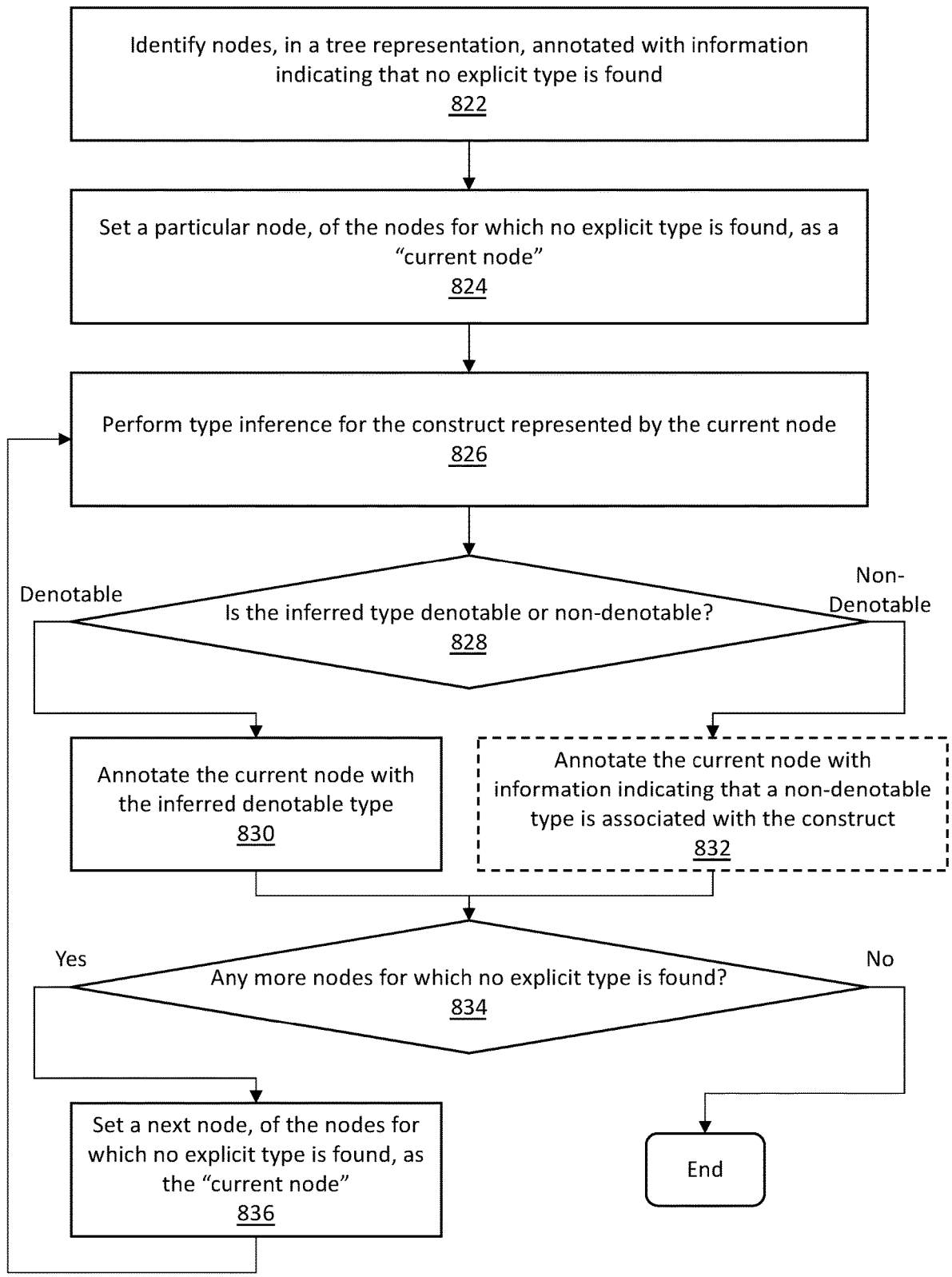

FIG. 8B illustrates an example set of operations for another type attribution process for a tree representation of a set of code according to an embodiment. One or more operations illustrated in FIG. 8B may be modified, rearranged, or omitted all together. Accordingly, the particular sequence of operations illustrated in FIG. 8B should not be construed as limiting the scope of one or more embodiments.

One or more embodiments include identifying nodes, in a tree representation, annotated with information indicating that no explicit type is found (Operation 822). A compiler analyzes the annotations associated with a tree representation of a set of code. The compiler identifies nodes associated with annotations indicating, "No explicit type found." In an alternative embodiment, the compiler may verify that a type attribution process was previously performed and identify nodes in the tree representation that remain unannotated after the previously-performed type attribution process. In an alternative embodiment, the compiler may retrieve a "To Review" list from a data repository. The compiler previously generated the "To Review" to list store identifiers of nodes for which no explicit type is found.

One or more embodiments include setting a particular node, of the nodes for which no explicit type is found, as a "current node" (Operation 824). The compiler sets a particular node, of the nodes for which no explicit type is found, as a "current node." The compiler may initially set, for example, a node for which no explicit type is found and is closest to the top of the tree representation as the "current node."

One or more embodiments include performing type inference for the construct represented by the current node (Operation 826). The compiler performs type inference for the construct represented by the current node. Based on analysis of the code (such as tokening, lexing, parsing), the compiler may infer a specific denotable type (such as int, String, Bar, DeprecatedFoo) for the construct. Alternatively, the compiler may infer a specific non-denotable type (such as, anonymous type, intersection type, capture type, tuple type) for the construct. Type inference is further described above with reference to inferred types of FIG. 6 (denotable types 610 and inferred non-denotable types 612).

Referring back to Example 7, a compiler may generate a tree representation with (a) an interior node representing the assign operation; (b) a left child node representing the construct x; and (c) a right child node representing the construct new Bar (). The compiler previously traversed the left child node and determined that no explicit type is specified for the construct x. The compiler may now traverse the right child node and determine that the initializer generates an object of the denotable type Bar. Based on the initializer, the compiler may infer that a type of the construct x is Bar.

Referring back to Example 10, a compiler may generate a tree representation with (a) an interior node representing the assign operation; (b) a left child node representing the construct x; and (c) a right child node representing the construct new Bar( ){void m ( ){ . . . }}. The compiler previously traversed the left child node and determined that no explicit type is specified for the construct x. The compiler may now traverse the right child node. The compiler may determine that new Bar( ){void m ( ){ . . . } is not an initializer of a denotable type. Additionally or alternatively, the compiler may determine that new Bar( ){void m( ){ . . . } constitutes an anonymous type expression. Therefore, the compiler may infer that a non-denotable type is associated with the construct x. Additionally or alternatively, the compiler may infer that, specifically, an anonymous type is associated with the construct x.

One or more embodiments include determining whether an inferred type for the construct represented by the current node is denotable or non-denotable (Operation 828). The compiler determines whether type inference resolved into an inferred denotable type or an inferred non-denotable type for the construct represented by the current node.

In some embodiments, the compiler is unable to infer any type for the construct represented by the current node. The compiler may issue an error and/or warning indicating that type inference is not successful. If neither an explicit type nor an inferred type can be determined for the construct, then quality checking for the construct cannot be performed.

If an inferred denotable type is determined for the construct, then one or more embodiments include annotating the current node with the inferred denotable type (Operation 830). The compiler associates the current node with an annotation that indicates that the construct represented by the current node is associated with the inferred denotable type. As an example, a compiler may determine that an inferred denotable type for the variable x is Bar. A compiler may associate a node representing the variable x with an annotation indicating the type Bar.

The annotation of the inferred denotable type may be in the same form as the annotation of any explicit type. One looking at the tree representation is not able to discern any difference in form between nodes annotated with explicit types and nodes annotated with inferred denotable types. One simply sees that the node is annotated with a type. As an example, regardless of whether the type Bar is explicit or inferred, a node may be simply annotated with Bar. Alternatively, the annotation of the inferred denotable type may be in a different form from the annotation of any explicit type. The annotation itself may be associated with an indicator to indicate whether the type is explicit or inferred. As an example, if the type Bar is explicit for the variable x, a node representing the variable x may be annotated with "Bar, explicit." If the type Bar is inferred for the variable y, a node representing the variable y may be annotated with "Bar, inferred."

If an inferred non-denotable type is determined for the construct, then one or more embodiments include annotating the current node with information indicating that a non-denotable type is associated with the construct (Operation 832). The compiler associates the current node with an annotation that indicates that the construct represented by the current node is associated with a non-denotable type.

Annotating the current node with information indicating that a non-denotable type is associated with the construct may take various forms. For example, such an annotation may include annotating the current node with information simply specifying that a generic non-denotable type is associated with the construct. The annotation may simply state, "Non-denotable type." Or, such an annotation may include annotating the current node with a specific category of non-denotable types, such as "Anonymous type," or "Intersection type." Or, such an annotation may include annotating the current node with a specific non-denotable type, such as a reference to an internal representation of the non-denotable type. Or, such an annotation may include annotating the current node with information indicating no inferred denotable type is determined for the construct. Or such annotation may include leaving the current node unannotated. By verifying that the attribution process of FIG. 8B has been performed, a missing annotation on the current node may indicate that an inferred non-denotable type is associated with the construct.

One or more embodiments include determining whether there are any more nodes for which no explicit type is found to traverse (Operation 834). The compiler determines whether there are any more nodes for which no explicit type is found to traverse. For example, the compiler may determine whether the current node has any descendant node for which no explicit type is found. Additionally or alternatively, the compiler may determine whether any other previously-traversed nodes have any descendant node for which no explicit type is found. If a current node or previously-traversed node has a descendant node for which no explicit type is found, then there are more nodes to traverse.

One or more embodiments include setting a next node, of the nodes for which no explicit type is found, as the "current node" (Operation 836). The compiler sets a next node for which no explicit type is found as the "current node." The next node may be, for example, a descendant node of the current node for which no explicit type is found; a descendant node of another previously-traversed node for which no explicit type; or a sibling node, of the current node or another previously-traversed node, for which no explicit type.

If the current node and previously-traversed nodes do not have any descendant nodes for which no explicit type is found, then there are no more nodes to traverse, and the type attribution process ends. After all nodes for which no explicit type is found are traversed, the compiler may optionally store an indication indicating that the type attribution process of FIG. 8B has been performed.

Figure 9:
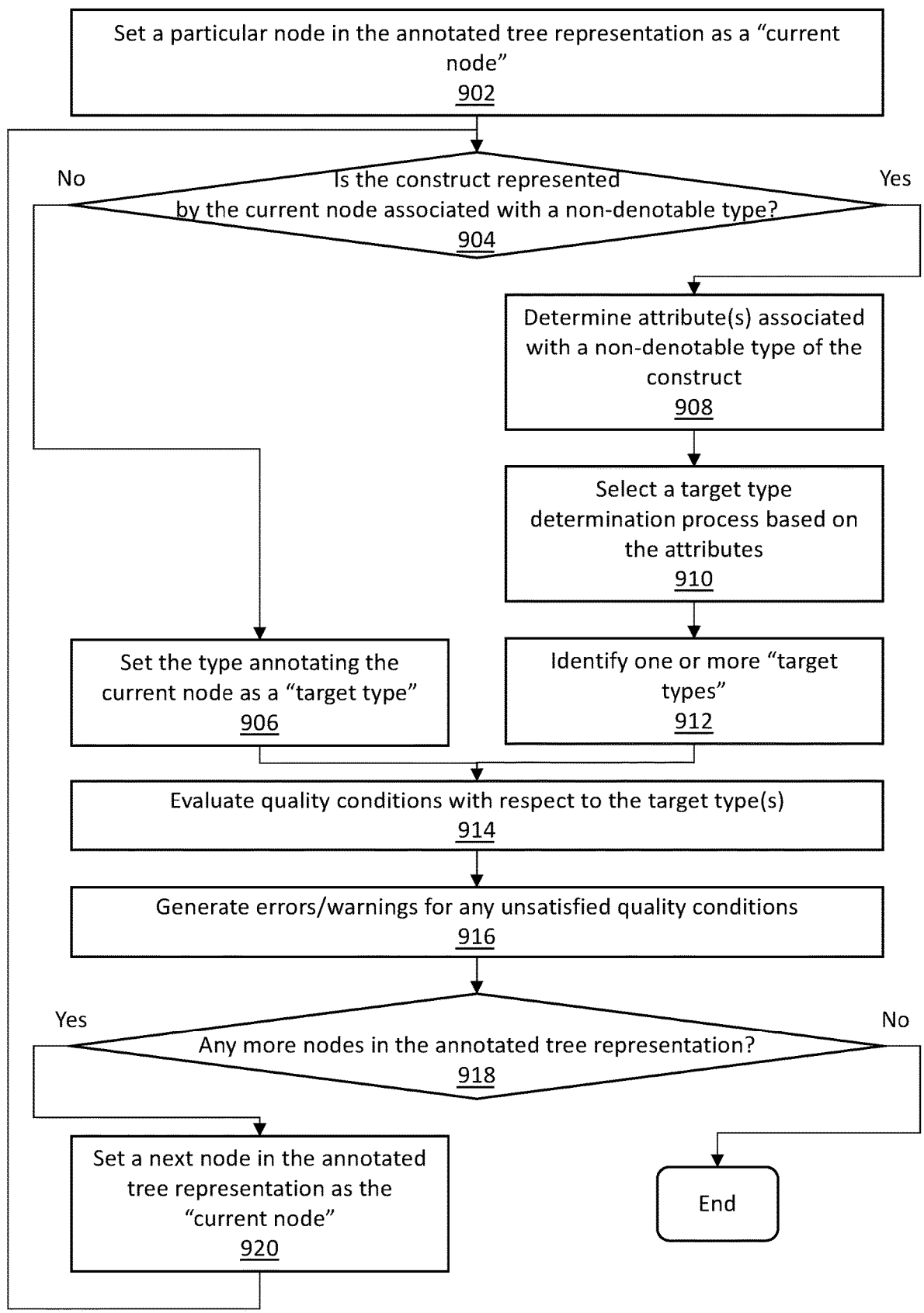
FIG. 9 illustrates an example set of operations for a quality checking process for an annotated tree representation of a set of code according to an embodiment.

FIG. 9 illustrates an example set of operations for a quality checking process for an annotated tree representation of a set of code according to an embodiment. One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments include setting a particular node in the annotated tree representation as a "current node" (Operation 902). A compiler begins traversal of a tree representation. The compiler sets a particular node in the tree representation as a "current node." The compiler may initially set, for example, the root of the tree representation as the "current node," such that the tree representation is traversed from the top down.

One or more embodiments include determining whether the construct represented by the current node is associated with a non-denotable type (Operation 904). The compiler determines whether the construct represented by the current node is associated with a non-denotable type based on the annotated tree representation.

Determining whether the construct represented by the current node is associated with a non-denotable type may be based on various different criteria. One criteria that may be used includes determining whether the current node is annotated with any type at all. If the current node is annotated with a type (explicit or inferred), then the compiler may determine that the construct is not associated with a non-denotable type. Else if the current node is not annotated with any type, and the type attribution processes of FIGS. 8A-B have been performed, then the compiler may determine that the construct is associated with a non-denotable type. Additionally or alternatively, another criteria that may be used includes determining whether the current node is annotated with information indicating that a non-denotable type is associated with the construct. If the current node has such annotation, then the compiler may determine that the construct is associated with a non-denotable type. Else if the current node does not have such annotation, then the compiler may determine that the construct is not associated with a non-denotable type.

If the construct is not associated with a non-denotable type, then one or more embodiments include setting the type annotating the current node as a "target type" (Operation 906). The compiler analyzes the tree representation and identifies the annotation associated with the current node. The compiler identifies the type specified by the annotation, which may be an explicit type or an inferred type. The compiler determines the type specified by the annotation as a "target type."

If the construct is associated with a non-denotable type, then one or more embodiments include determining one or more attributes associated with the non-denotable type (Operation 908). The compiler analyzes the code surrounding the construct. Based on the surrounding code, the compiler determines one or more attributes associated with a non-denotable type of the construct.

As an example, a compiler may determine that code surrounding a construct includes an anonymous type expression. Based on the anonymous type expression, the compiler may determine that the construct is associated with an anonymous type, which is a category of non-denotable types.

As another example, a compiler may determine that code surrounding a context includes assigning multiple values of different denotable types to a variable. Based on the assignment, the compiler may determine that the construct is associated with an intersection type, which is a category of non-denotable types.

As another example, a compiler may determine that code surrounding a context includes a wildcard expression. Based on the wildcard expression, the compiler may determine that the construct is associated with a capture type, which is a category of non-denotable types.

In some embodiments, an attribute of a non-denotable type of the construct is previously determined in a type attribution process. During the type attribution process, the compiler annotated the current node with the attribute of the non-denotable type of the construct. The compiler subsequently determines the attribute of the non-denotable type of the construct based on the annotation.

One or more embodiments include selecting a target type determination process, from a candidate set of target type determination processes, based on the attributes associated with a non-denotable type of the construct (Operation 910). The compiler identifies a candidate set of target type determination processes stored in a data repository. The compiler selects a target type determination process, from the candidate set of target type determination processes, based on the attributes associated with a non-denotable type of the construct.

In some embodiments, the compiler makes the selection based on mappings between the candidate set of target type determination processes and possible attributes of non-denotable types. As an example, a table may indicate the following mappings:

TABLE 1

| Non-Denotable Type Category | Target Type Selection Process |
| --- | --- |
| Anonymous | Selection Process #1 |
| Intersection | Selection Process #2 |
| Capture | Selection Process #3 |
| Tuple | Selection Process #4 |

In some embodiments, the compiler makes the selection based on a scoring process that scores the candidate set of target type determination processes based on the attributes associated with a non-denotable type of the construct. In some embodiments, additional and/or alternative selection processes may be used.

In some embodiments, a target type determination process is a part of a quality checking process that is implemented based on the specific non-denotable type associated with the construct. Different target type determination processes are used for different non-denotable types that are associated with different constructs. As described above, a use-site check is generally implemented based on the types associated with the constructs based on the set of code. Different use-site check operations are used for different types that are associated with different constructs. Therefore, a target type determination process and a use-site check are similar in the sense that both processes are implemented based on the type associated with the construct that is being checked.

One or more embodiments include identifying one or more "target types" using the selected target type determination process (Operation 912). The compiler identifies one or more "target types" by executing operations included in the selected target type determination process.

As an example, a particular construct may be associated with an anonymous type. A target type determination process for anonymous types may include the operations: identifying a super-type of the anonymous type; and determining the super-type as a "target type." The compiler may execute the operations to identify the target type.

As another example, a particular construct may be associated with an intersection type. A target type determination process for intersection types may include the operations: identifying components of the intersection type; and determining the components as "target types."

As another example, a particular construct may be associated with a capture type. A target type determination process for capture types may include the operations: identifying one or more bounds of the intersection type; and determining the bounds as "target types."

One or more embodiments include evaluating quality conditions with respect to the one or more target types determined at Operation 906 or Operation 912 (Operation 914). The compiler identifies a set of quality conditions to be evaluated. In some embodiments, the quality conditions to be evaluated with respect to a particular target type are determined based on characteristics of the particular target type. As an example, a particular deprecation quality condition may be evaluated for explicit types, but not inferred types. Or, a particular test-use-only quality condition may be evaluated for denotable types, but not non-denotable types.

If Operation 906 is executed and Operation 912 is not executed, then the compiler evaluates each quality condition with respect to the target type determined at Operation 906. The target type determined at Operation 906 is the type (explicit or inferred) annotating the current node, as described above. Hence, if the construct represented by the current node is of an explicit type or inferred denotable type, the quality conditions are evaluated with respect to the type annotating the current node. In this sense, such an evaluation is similar to a declaration-site check, which are generally implemented based on the types as indicated by the annotations for the nodes of a tree representation, as described above.

As an example, a set of quality conditions may require that a type not be deprecated and that a type be accessible. A variable x may be associated with an explicit type Bar1. A node in a tree representation representing the variable x may be annotated with Bar1. Hence, the explicit type Bar1 is a target type for evaluating the quality conditions. In quality checking for the variable x, a compiler determines whether the type Bar1 is deprecated. The compiler also determines whether the type Bar1 is accessible. Another variable y may be associated with an inferred denotable type Bar2. A node in the tree representation representing the variable y may be annotated with Bar2. Hence, the inferred denotable type Bar2 is a target type for evaluating the quality conditions. In quality checking for the variable y, a compiler determines whether the type Bar2 is deprecated. The compiler also determines whether the type Bar2 is accessible.

Conversely, if Operation 912 is executed and Operation 906 is not executed, then the compiler evaluates each quality condition with respect to each target type determined at Operation 912. The compiler evaluates the quality conditions with respect to the target types, even though the construct is actually of a non-denotable type rather than any of the target types. The target types are determined based on a target type determination process, selected based on an attribute of a non-denotable type associated with the construct, as described above. Hence, if the construct represented by the current node is of an inferred non-denotable type, a target type determination process is implemented based on the inferred non-denotable type associated with the construct (similar to a use-site check), and quality conditions are evaluated with respect to the determined target types (similar to a declaration-site check, applied to the target types rather than any type indicated by annotations of nodes of a tree representation).

As an example, a set of quality conditions may require that a type not be deprecated and that a type be accessible. A variable z may be associated with an anonymous type that has Ban as a super-type. A node in a tree representation representing the variable z may be annotated with "Associated with an anonymous type." A compiler may select a target type determination process based on determining that the variable z is associated with an anonymous type. The compiler uses the selected target type determination process to determine that the super-type of the anonymous type is Ban and determine that the super-type Ban is a target type for evaluating the quality conditions. In quality checking for the variable z, the compiler determines whether the type Bar1 is deprecated. The compiler also determines whether the type Bar1 is accessible. Hence, in the above example, the compiler quality checks for the variable z, based on the target type Bar1, even though the variable z is not of the type Bar1 (rather, the variable z is of an anonymous type whose super-type is Bar1).

One or more embodiments include generating errors and/or warnings for any unsatisfied quality conditions (Operation 916). The compiler determines whether any of the quality conditions are not satisfied. The compiler generates errors for any unsatisfied quality conditions. As an example, a compiler may determine that a quality condition requiring a type be accessible is satisfied. The compiler may determine that a quality condition requiring the type not be deprecated is not satisfied. The compiler may thus generate an error based on the type being deprecated.

One or more embodiments include determining whether there are any more nodes in the annotated tree representation to traverse (Operation 918). The compiler determines whether there are any more nodes in the tree representation to traverse. For example, the compiler may determine whether the current node has any child node. Additionally or alternatively, the compiler may determine whether any other previously-traversed nodes have any child node. If a current node or previously-traversed node has a child node, then there are more nodes to traverse.

In an alternative embodiment, the compiler uses a "To Review" list to store identifiers of nodes for which no explicit type is found. The compiler reviews the "To Review" list to determine whether there are any more nodes to traverse.

One or more embodiments include setting a next node in the annotated tree representation as the "current node" (Operation 920). The compiler sets a next node in the tree representation as the "current node." The next node may be, for example, a child node of the current node; a child node of another previously-traversed node; or a sibling node of the current node or another previously-traversed node.

If the current node and previously-traversed nodes do not have any child nodes, then there are no more nodes to traverse, and the quality checking process ends. After all nodes in the tree representation are traversed, the compiler may optionally store an indication indicating that the quality checking process of FIG. 9 has been performed.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
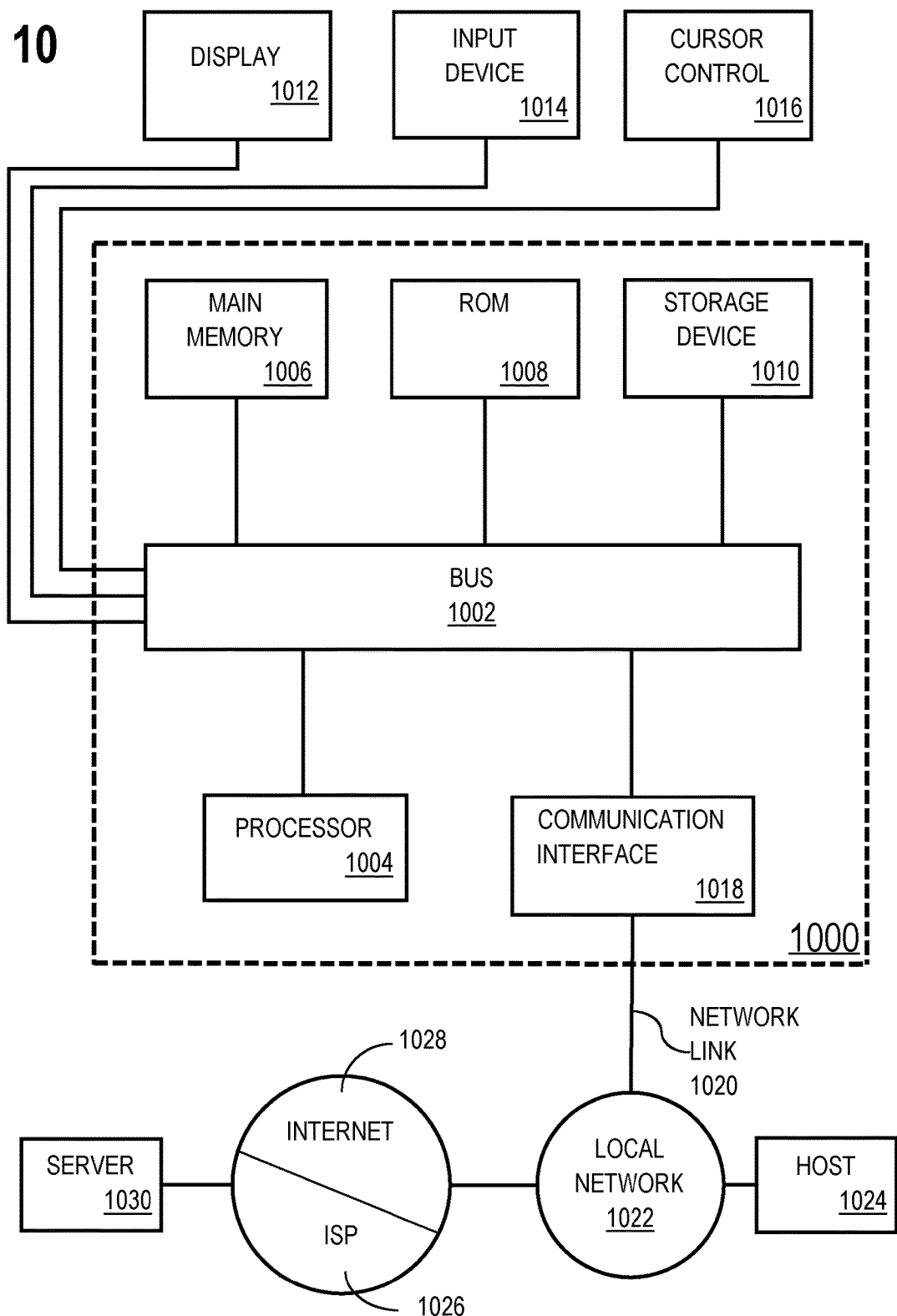
FIG. 10 illustrates a system in accordance with one or more embodiments.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:
    identifying a plurality of constructs specified in the set of code;
    generating a plurality of nodes, in a tree representation, respectively representing the plurality of constructs;
        determining that the set of code does not specify any explicit type for a first construct of the plurality of constructs;
        performing type inference for the first construct to determine an inferred denotable type for the first construct;
        annotating a first node, of the plurality of nodes, representing the first construct with the inferred denotable type;
        determining that the inferred denotable type is associated with the first construct based on the annotated first node during a traversal of the tree representation;
        evaluating a set of one or more quality conditions with respect to the inferred denotable type;
            wherein evaluating the set of one or more quality conditions with respect to the inferred denotable type is performed by at least one of:
    a compiler; and
    an integrated development environment (IDE);
        determining that a particular quality condition, of the set of one or more quality conditions, is not satisfied with respect to the inferred denotable type;
        generating an error or warning for the first construct based on the particular quality condition not being satisfied with respect to the inferred denotable type.

2. The one or more media of claim 1, further storing instructions which, when executed by the one or more processors, cause:
    presenting, on a user interface, the error or warning for the first construct based on the particular quality condition not being satisfied with respect to the inferred denotable type.

3. The one or more media of claim 1, further storing instructions which, when executed by the one or more processors, cause:
    determining a position, in the set of code, for indicating the error or warning for the first construct;
    wherein the set of code does not include any positions corresponding to specifying any explicit type for the second construct, and the position indicating the error or warning for the second construct cannot be within any positions corresponding to the set of code specifying any explicit type for the second construct.

4. The one or more media of claim 1, wherein the set of one or more quality conditions comprises one or more of:
    a condition requiring that a type is not deprecated;
    a condition requiring that a type is not a raw type;
    a condition requiring that a type is not restricted for test use;
    a condition requiring that a type is observable;
    a condition requiring that a type is readable;
    a condition requiring that a type is accessible;
    a condition requiring that a type is well formed.

5. The one or more media of claim 1, wherein the first construct is at least one of:
   a local variable declared without specification of any explicit type;
   a variable in a lambda expression without specification of any explicit type;
   a generic method invoked without specification of any explicit type argument.

6. The one or more media of claim 1, wherein evaluating the set of one or more quality conditions with respect to the inferred denotable type is performed by a compiler.

7. The one or more media of claim 1, wherein evaluating the set of one or more quality conditions with respect to the inferred denotable type is performed by an integrated development environment (IDE).

8. The one or more media of claim 1, further storing instructions which, when executed by the one or more processors cause:
   performing a first type attribution process to annotate the tree representation with type information, wherein the first type attribution process comprises:
      performing a first traversal of the tree representation to determine whether the set of code specifies any explicit type for each of the plurality of constructs respectively represented by the plurality of nodes;
      responsive to determining that the set of code does not specify any explicit type for the first construct: annotating the first node representing the first construct with information indicating that no explicit type is attributed to the first construct;
      responsive to determining that the set of code specifies an explicit type for a second construct of the plurality of constructs: annotating a second node of the plurality of nodes representing the second construct with the explicit type;
   performing a second type attribution process to annotate the tree representation with the type information, wherein the second type attribute process comprises:
      performing a second traversal of the tree representation to determine whether the tree representation annotated with the type information indicates that no explicit type is attributed for each of the plurality of nodes;
      responsive to determining that the tree representation indicates that no explicit type is attributed for the first node:
         performing type inference for the first construct represented by the first node to determine an inferred denotable type for the first construct;
         annotating the first node with the inferred denotable type.

9. One or more non-transitory machine-readable media storing instructions which, when executed by one or more processors, cause:
   determining that an inferred non-denotable type is associated with a first construct of a plurality of constructs specified in a set of code, wherein the inferred non-denotable type is a type that is not explicitly declared in the set of code;
   determining a set of one or more target types for evaluating a set of one or more quality conditions based on the inferred non-denotable type associated with the first construct;
   evaluating the set of one or more quality conditions with respect to each of the set of one or more target types determined based on the inferred non-denotable type associated with the first construct;
   wherein evaluating the set of one or more quality conditions with respect to each of the set of one or more target types determined based on the inferred non-denotable type associated with the first construct is performed by at least one of:
   a compiler; and
   an integrated development environment (IDE);
      determining that a particular quality condition, of the set of one or more quality conditions, is not satisfied with respect to a particular target type, of the set of one or more target types;
      generating an error or warning for the first construct based on the particular quality condition not being satisfied with respect to the particular target type.

10. The one or more media of claim 9, further comprising instructions, which when executed by the one or more processors, cause:
    determining that the set of code does not specify any explicit type for the first construct;
    wherein determining that the inferred non-denotable type is associated with the first construct is responsive at least to determining that the set of code does not specify any explicit type for the first construct.

11. The one or more media of claim 9, wherein determining that the inferred non-denotable type is associated with the first construct comprises determining that at least one of an anonymous type, interaction type, capture type, and tuple type is associated with the first construct.

12. The one or more media of claim 9, wherein determining that the inferred non-denotable type is associated with the first construct comprises determining that a node, in a tree representation of the set of code, representing the first construct is annotated with information indicating that the inferred non-denotable type is associated with the first construct.

13. The one or more media of claim 9, further storing instructions which, when executed by the one or more processors, cause:
    determining an attribute associated with the inferred non-denotable type associated with the first construct;
    selecting a target type determination process, from a candidate set of target type determination processes, based on the attribute associated with the inferred non-denotable type associated with the first construct;
    wherein the set of one or more target types are determined using the target type determination process.

14. The one or more media of claim 9, wherein determining the set of one or more target types for evaluating the set of one or more quality conditions based on the inferred non-denotable type associated with the first construct comprises:
    determining that the inferred non-denotable type associated with the first construct is an anonymous type;
    identifying a super-type of the anonymous type;
    determining the super-type as the set of one or more target types for evaluating the set of one or more quality conditions.

15. The one or more media of claim 14, further storing instructions, which when executed by the one or more processors, causes:
    determining a position, in the set of code, for indicating the error or warning for the first construct;
    wherein the position indicating the error or warning for the first construct is within a set of positions corresponding to the set of code specifying the super-type of the anonymous type.

16. The one or more media of claim 9, wherein determining the set of one or more target types for evaluating the set of one or more quality conditions based on the inferred non-denotable type associated with the first construct comprises:
- determining that the inferred non-denotable type associated with the first construct is an intersection type;
- identifying a plurality of components of the intersection type;
- determining the plurality of components as the set of one or more target types for evaluating the set of one or more quality conditions.

17. The one or more media of claim 9, wherein determining the set of one or more target types for evaluating the set of one or more quality conditions based on the inferred non-denotable type associated with the first construct comprises:
- determining that the inferred non-denotable type associated with the first construct is a capture type;
- identifying a bound of the capture type;
- determining the bound as the set of one or more target types for evaluating the set of one or more quality conditions.

18. The one or more media of claim 9, further storing instructions which, when executed by the one or more processors cause:
- generating a plurality of nodes, in a tree representation, respectively representing the plurality of constructs;
- performing a first type attribution process to annotate the tree representation with type information, wherein the first type attribution process comprises:
  - performing a first traversal of the tree representation to determine whether the set of code specifies any explicit type for each of the plurality of constructs respectively represented by the plurality of nodes;
  - responsive to determining that the set of code does not specify any explicit type for the first construct: annotating the first node representing the first construct with information indicating that no explicit type is attributed to the first construct;
- performing a second type attribution process to annotate the tree representation with the type information, wherein the second type attribute process comprises:
  - performing a second traversal of the tree representation to determine whether the tree representation indicates that no explicit type is attributed for each of the plurality of nodes based on the first type attribution process;
  - responsive to determining that the tree representation indicates that no explicit type is attributed for the first node:
    - responsive to determining that the inferred non-denotable type is associated with the first construct represented by the first node: annotating the first node with information indicating that the inferred non-denotable type is associated with the first construct;
- performing one or more quality checking processes for the tree representation with the type information, wherein the one or more quality checking processes comprise:
  - performing one or more traversals of the tree representation to evaluate the set of one or more quality conditions;
  - evaluating the set of one or more quality conditions with respect to each of the set of one or more target types determined based on the inferred non-denotable type associated with the first construct.

19. The one or more media of claim 18, wherein:
the first type attribution process further comprises:
- responsive to determining that the set of code specifies an explicit type for a second construct of the plurality of constructs: annotating a second node, of the plurality of nodes, representing the second construct with the explicit type;
the one or more quality checking processes further comprise:
- evaluating the set of one or more quality conditions with respect to the explicit type associated with the second construct.

20. The one or more media of claim 18, wherein:
the second type attribution process further comprises:
- responsive to determining that the tree representation indicates that no explicit type is attributed for a second node, of the plurality of nodes, representing a second construct, of the plurality of constructs:
  - responsive to determining that an inferred denotable type is associated with the second construct represented by the second node: annotating the second node with the inferred denotable type;
the one or more quality checking processes further comprise:
- evaluating the set of one or more quality conditions with respect to the inferred denotable type associated with the second construct.

* * * * *

UNITED STATES PATENT AND TRADEMARK OFFICE
CERTIFICATE OF CORRECTION

PATENT NO. : 10,983,771 B1
APPLICATION NO. : 16/690911
DATED : April 20, 2021
INVENTOR(S) : Hegarty et al.

Page 1 of 2

It is certified that error appears in the above-identified patent and that said Letters Patent is hereby corrected as shown below:

On the Title Page

On page 2, Column 1, Item (56) under Other Publications, Line 6, delete "at" and insert -- et --, therefor.

In the Specification

In Column 7, Line 58, delete "add12 and13" and insert -- add12and13 --, therefor.

In Column 7, Line 62, delete "add12 and13" and insert -- add12and13 --, therefor.

In Column 7, Line 64, delete "add12 and13" and insert -- add12and13 --, therefor.

In Column 12, Line 53, delete "(1+2)" and insert -- 5*(1+2) --, therefor.

In Column 14, Line 33, delete "Bar( ));" and insert -- Bar( ))); --, therefor.

In Column 14, Line 57, delete "5<String>in" and insert -- 5<String> in --, therefor.

In Column 14, Line 60, delete "5<String>in" and insert -- 5<String> in --, therefor.

In Column 16, Line 14, delete "<I," and insert -- <T, --, therefor.

In Column 16, Line 16, delete "Bar( ));" and insert -- Bar( ))); --, therefor.

In Column 21, Line 61, delete "FIG." and insert -- FIGS. --, therefor.

In Column 24, Line 24, delete "DeprecatedFoo( );" and insert -- DeprecatedFoo( )); --, therefor.

In Column 24, Line 49, delete "<I>T" and insert -- <T>T --, therefor.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,983,771 B1

In Column 24, Line 63, delete "Foo( );" and insert -- Foo( )); --, therefor.

In Column 27, Line 35, delete "Bar ()." and insert -- Bar(). --, therefor.